(12) United States Patent
Mackjust et al.

(10) Patent No.: US 7,248,150 B2
(45) Date of Patent: Jul. 24, 2007

(54) MENU-DRIVEN REMOTE CONTROL TRANSMITTER

(75) Inventors: Tyson James Mackjust, Vista, CA (US); Mark Edward Rutledge, Murietta, CA (US); Jerry Wayne Birchfield, Vista, CA (US)

(73) Assignee: Directed Electronics, Inc., Vista, CA (US)

( * ) Notice: Subject to any disclaimer, the term of this patent is extended or adjusted under 35 U.S.C. 154(b) by 263 days.

(21) Appl. No.: 10/699,009

(22) Filed: Oct. 30, 2003

(65) Prior Publication Data

US 2004/0090315 A1 May 13, 2004

Related U.S. Application Data

(63) Continuation-in-part of application No. 10/236,716, filed on Sep. 6, 2002, now Pat. No. 6,700,479, which is a continuation-in-part of application No. 09/732,525, filed on Dec. 6, 2000, now Pat. No. 6,452,483, which is a continuation-in-part of application No. 08/790,954, filed on Jan. 29, 1997, now Pat. No. 6,184,779.

(51) Int. Cl.
*B60R 25/10* (2006.01)

(52) U.S. Cl. ............................. 340/426.13; 340/426.15; 340/426.17

(58) Field of Classification Search ............. 340/425.5, 340/426.1, 426.13, 426.14, 426.15, 426.16, 340/426.17, 426.18, 426.28, 426.3, 539.24; 701/35, 213; 345/156

See application file for complete search history.

(56) References Cited

U.S. PATENT DOCUMENTS

| | | | |
|---|---|---|---|
| 3,944,982 A | 3/1976 | Mogi et al. | |
| 3,949,297 A | 4/1976 | Hideshima | |
| 3,971,986 A | 7/1976 | Hideshima et al. | |
| 3,988,701 A | 10/1976 | Funston | |
| 4,021,756 A | 5/1977 | Podowski et al. | |
| 4,041,394 A | 8/1977 | Pate | |
| 4,746,919 A | 5/1988 | Reitmeier | |
| 4,890,108 A | 12/1989 | Drori et al. | |
| 4,963,876 A | 10/1990 | Sanders et al. | |
| 5,038,401 A | 8/1991 | Inotsume | |
| 5,218,290 A * | 6/1993 | Beckert et al. | 324/115 |
| 5,357,560 A | 10/1994 | Nykerk | |
| 5,648,781 A | 7/1997 | Choi | |
| 5,712,638 A | 1/1998 | Issa | |
| 5,774,051 A | 6/1998 | Kostusiak | |
| 5,783,989 A * | 7/1998 | Issa et al. | 340/426.25 |
| 5,797,091 A * | 8/1998 | Clise et al. | 455/404.2 |
| 5,825,353 A * | 10/1998 | Will | 345/184 |
| 5,919,239 A * | 7/1999 | Fraker et al. | 701/35 |
| 5,986,543 A * | 11/1999 | Johnson | 340/426.19 |

(Continued)

*Primary Examiner*—Van T. Trieu
(74) *Attorney, Agent, or Firm*—KC Bean, Esq.; Anatoly S. Weiser, Esq.

(57) ABSTRACT

A digital processor-based remote controller of a wireless remote control system includes a small number of manual input devices, such as keys and scroll wheels, and a graphical user interface. The remote controller can have a single scroll wheel with internal push-to-activate switch, and a small display. This configuration minimizes the size of the remote controller, while allowing for a large number of different control commands to be transmitted to the controlled system. In addition, the remote controller can be configured by the user for both right- and left-handed operation.

15 Claims, 13 Drawing Sheets

U.S. PATENT DOCUMENTS 6,127,941 A * 10/2000 Van Ryzin ............ 340/825.69
6,130,726 A    10/2000 Darbee et al.
6,140,938 A * 10/2000 Flick .................... 340/825.69
6,158,655 A    12/2000 DeVries, Jr. et al.
6,636,197 B1 * 10/2003 Goldenberg et al. ........ 345/156

* cited by examiner

MENU-DRIVEN REMOTE CONTROL TRANSMITTER

REFERENCE TO RELATED APPLICATIONS

This application is a continuation-in-part and claims priority benefit of U.S. application Ser. No. 10/236,716, entitled Vehicle Security System Having Advanced Wireless Function-Programming Capability, filed Sep. 6, 2002, now U.S. Pat. No. 6,700,479; which application is a continuation-in-part of U.S. application Ser. No. 09/732,525, filed Dec. 6, 2000, now U.S. Pat. No. 6,452,483, entitled Vehicle Security System Having Advanced Wireless Function-Programming Capability; which is a continuation-in-part of U.S. application Ser. No. 08/790,954, filed Jan. 29, 1997, now U.S. Pat. No. 6,184,779, entitled Vehicle Security System Having Wireless Function-Programming Capability. The above-referenced related applications and patents are hereby incorporated by reference as if fully set forth herein.

BACKGROUND OF THE INVENTION

1. Field of the Invention

The present invention relates generally to remote control systems (RC Systems or simply RCS's), and, more particularly, to remote control transmitters and transceivers (RCTs).

2. Background

Remote controls are widely used to operate television sets, videocassette recorders, digital video players, radios, compact discs, audio tape players, and many other audio and video components and systems. Remote control systems have also been used for decades to control many devices beyond the standard fare of entertainment systems. For example, remote control systems can be used to operate model airplanes, railroad locomotives, boats, cars, and other toys. Remote controls can also be used to exercise functions of security systems, including vehicle and home security systems. Many other remote control applications can be thought of, including control of generators and smart homes. In general, a remote control system includes a remote controller, or simply a remote control, and a device controlled or operated by the remote control. Thus, a remote control is a device or implement through which the operation of one or more systems can be controlled by transmission of control information. It is a device for controlling the operation of the system or systems, as distinguished from a device used solely for transmitting authentication or transaction selection and authorization data.

More often than not, remote control systems are wireless systems. By "wireless" we mean that no direct mechanical connection needs to exist between a controlled apparatus and its corresponding remote control, to transmit control commands between them; instead, the remote control transmits the commands over a wireless link. The wireless link can be an ultrasound link, with the controller transmitting ultrasound signals from an ultrasound transducer to the controlled system. The link can also be a radio frequency (RF) link, including a link implemented over a microwave frequency band, or an infrared (IR) link. These are only some of the more common wireless links, and we do not exclude any other electromagnetic or sound frequencies from the scope of the word wireless in the present context.

With the progress of electronic industry over the years, the capabilities of remote controls have increased substantially. For example, many of the early RF remote control transmitters used only the operating frequency and time (duration) of transmission to operate their controlled systems. Today, there are frequency hopping and direct sequence spread spectrum remote control transmitters with code hopping or code rolling capabilities. Sophisticated encryption algorithms are sometimes used for transmissions over control links, making it difficult to duplicate a particular remote control transmitter without knowledge of its operating scheme. In sum, the technological field of remote controls has grown and advanced with the rest of electronic technologies.

Some of these technological advances have enabled miniature and relatively inexpensive electronic circuitry within a transmitter to operate many more functions of the controlled system than could be operated in the past. These developments have not gone unnoticed by product designers: the trend is to have more and more switches and keys on a remote control, to operate the increasingly sophisticated remotely controlled systems. One example of this trend is the availability of the so-called universal remote control—a remote control that can be manually programmed to learn the operational codes and provide remote control operation of many different entertainment devices.

The size of a typical remote control transmitter for operating a television set or similar entertainment device is about the size of a typical calculator: it can be held in one hand. The number of keys on the face of the typical remote control is perhaps somewhere between one and three dozen. As noted above, the number of available control functions continues to grow. At the same time, manufacturers would like to contain the size of the remote control within the same "hand-held" limits. Because the size of a finger-operated key cannot be decreased much below the size of an average fingertip, the number of keys also needs to be limited.

In other applications, the size of the remote control is even more restricted. For example, a remote control for an automotive security system has to be carried by the driver. Often, the driver carries the remote control on a key chain, either in a pocket or purse. The remote control, the key chain with a few keys, and possibly a wallet or pocket change are expected to fit comfortably in a garment pocket. A remote controller with a multitude of finger-operated keys hardly fits this requirement.

For these and other reasons, the proliferation in the number of keys on the faces of remote controls is unwelcome. Several attempts have been made to reduce this number. For example, some television and other remote controls show the controlled function on the screen of the controlled system. In case of videocassette recorders and similar video devices other than television sets, the function is displayed on the attached television set. The user of the remote control selects the function by depressing the keys of the remote control, or by manipulating a pointing device, for example, a scrolling device built into the remote control. Such remote controls, however, presuppose the availability of a television set or monitor within the operator's viewing range. The range and applications of these devices are therefore limited.

According to a different technique, one key of a remote control is depressed multiple times to select a function with or without a visual or audible indicator, such as an LED or multiple LEDs (number of flashes or color) or a signal chirp, and another key is used to transmit the selected function command. In a variation of this technique, depressing the first key selects the function of the controlled system by selecting the channel or data word to be transmitted, and depressing the second key transmits the selected function command, with the function of each key being determined by the order in which the keys are depressed. As can be easily seen, these solutions still limit the total number of functions accessible from a small number of keys. Moreover, a user's selection of a particular function is made more difficult, because of the complicated sequence in which the keys must be depressed.

In another variation of the technique discussed in the preceding paragraph, one key is used to select a function by holding the key depressed until the desired transmitter channel or control data word is selected, and the remote control transmits the appropriate function selection command when the key is released. Here, however, the user is inconvenienced by the need to observe the LED flashes or color and flashes.

In accordance with another approach, a remote control transmitter uses a keypad with an optional display screen to select desired commands. The keypad is used in conjunction with the screen, in what amounts to a one-to-one correspondence between each of the multiple keys and multiple images (icons) on the screen. The screen can be a touch-sensitive screen, eliminating the need for a separate keypad. But the number of keys, whether being part of the keypad or part of the touch-sensitive screen, remains about the same as the number of functions controlled by the transmitter. Without the screen, the keys on the keypad control separate transmitter control channels or data words that control the functions of the system.

Remote control transmitters for television sets have also been known to incorporate screens for displaying television programming information, possibly including the title of the current program, a movie guide, a sports programming guide, or a children's programming guide. Such use of a display screen, however, does not decrease the number of keys on the remote control transmitter, or the size of the transmitter.

Users of remote controls often prefer to hold and operate the controls with the same hand. Because of the anatomy of the human hand, the finger of choice for pressing the keys is the thumb. Thus, the location of the keys on the face of the remote control is important. Unfortunately, what can be perfect key positioning for a right-handed user, can be a rather inconvenient key positioning for a left-handed user, and vice versa.

Information relevant to attempts to improve remote controls can also be found in U.S. Pat. Nos. 3,944,982; 3,949, 297; 3,971,986; 3,988,701; 4,021,756; 4,041,394; 4,746, 919; 4,890,108; 4,963,876; 5,038,401; 5,648,781; 5,712, 638; 5,774,051; 6,127,941; 6,130,726; and 6,158,655.

Although detailed analyses of the above-described attempts to improve remote controls are beyond the scope of the present document, each suffers from one or more of the following disadvantages: (1) large size of the remote control; (2) large number of activation keys and switches on the remote control; (3) small number of functions accessible through the remote control; (4) difficulty in selecting a desired function through the remote control; (5) lack of adaptability of the remote control to automotive security systems; (6) inability to configure the remote control for both right- and left-handed operation; and (7) inability to program conveniently the remote control in order to customize its operation and appearance.

A need thus exists for remote controllers that can control an increasing number of functions without an accompanying increase in the size of the device or in the number of keys needed to control these functions. A further need exists for miniature remote controllers capable of controlling a large number of functions. Still another need exists for miniature remote controllers that can control a large number of functions of automotive security systems. Yet another need exists for remote controllers that can be configured by the user for both right- and left-handed operation, and to be customized in other respects.

SUMMARY

The present invention is directed to apparatus that satisfies these needs. The apparatus disclosed is a remote controller that allows a user to operate a remote base system, i.e., the controlled system. The remote base system can be an access system, i.e., a security or a keyless entry system, a convenience system, i.e., a vehicle or other remote start and control system, or an audio/video system.

The remote controller and the remote base system that it controls communicate over a link, which can be a unidirectional link from the remote controller to the remote base system, or a bi-directional link, with information flowing from and to the remote controller.

The remote controller has a processor, e.g., a microprocessor or a microcontroller, with memory for storing instructions and data. Some of the memory is non-volatile, storing configuration information and program code. A display screen of the remote controller displays various menus, icons, and other information to the user under direction of the processor. The user can scroll through the menus and icons using an input device, for example, a scroll wheel, which may include an internal push-to-activate switch. The processor is connected to the input device so that it can read the status of the input device. Turning the scroll wheel of the input device instructs the processor to cause the display to scroll through the menus; pushing on the scroll wheel with an internal push-to-activate switch instructs the processor that the current menu item has been selected by the user. If there is no internal push-to-activate switch in the scroll wheel, an external switch could be used to activate the selection.

When the user makes a menu selection, the menu item selected generally corresponds either to a local or a remote command. Local commands are performed locally, by the remote controller. For remote commands, the processor formats a message to instruct the remote base system to perform the operation corresponding to the selected menu item. The processor then sends the message to the transmitter of the remote controller for transmission to the remote base system.

In some embodiments, the housing of the remote controller is miniature, about 1.5 inches or less in its longest horizontal dimension. To maximize the size of the display, most of the top surface area of the housing is dedicated to the display screen and the scroll wheel, with or without an internal push-to-activate switch; if needed, other switch(es) protrudes from the side of the remote controller, so as to be easily operable by the thumb or another finger of the hand holding the remote controller. In another variation of the design, the scroll wheel is built into the top surface area. This reduces the area available for the display screen and may lead to a slightly larger design.

For better visibility, the icons can be displayed one-at-a-time, so that each icon occupies most of the area of the display. In alternative embodiments, groups of icons are displayed on the screen.

To accommodate both right- and left-handed users, the display of the remote controller can be inverted under software control or by mechanical design. Under software control, one of the menu items effects this inversion when it is selected and activated by the user.

In one of the disclosed embodiments, the remote controller is built into a personal digital assistant (PDA) loaded with and executing special-purpose code. An RF (or other wireless) communication card plugs into a port of the PDA and performs wireless communication functions under control of the PDA. The screen of the PDA acts as the display of the remote controller, and the manual input devices of the PDA—a keyboard or stylus-like pen—is used to scroll and select the menu items. The PDA can also provide electrical power to the RF communication card.

In another embodiment, the remote controller includes a port for downloading software, icon and/or other control, data for use by the remote controller in the course of operating its controlled systems. The data enables the remote controller, for example, to operate additional controlled systems, and to display new icons.

BRIEF DESCRIPTION OF THE FIGURES

These and other features and aspects of the present invention will be better understood with reference to the following description, appended claims, and accompanying drawings, where:

DETAILED DESCRIPTION

Figure 1:
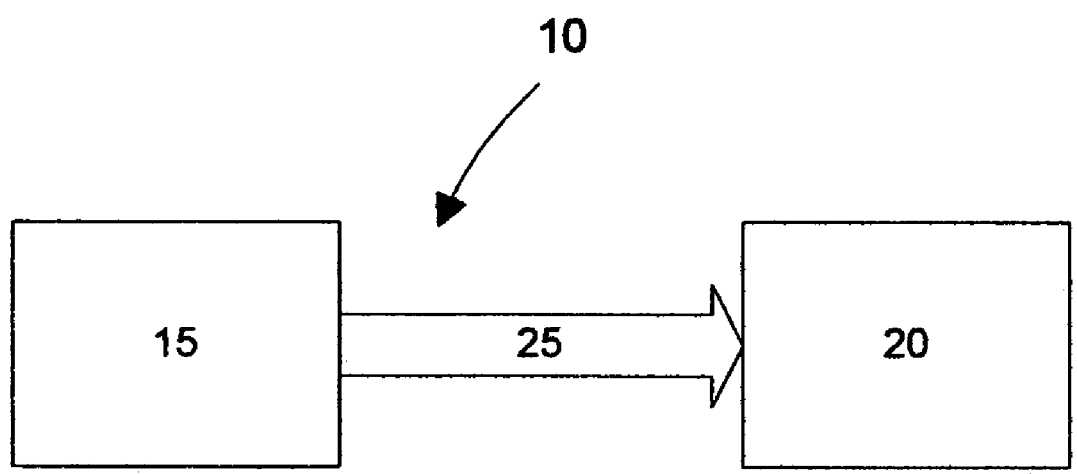
FIG. 1 is a simplified schematic diagram of a generalized remote control system in accordance with the present invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale. For purposes of convenience and clarity only, directional terms, such as top, bottom, left, right, up, down, over, above, below, beneath, rear, back, and front, are used with respect to the accompanying drawings. These and similar directional terms should not be construed to limit the scope of the invention in any manner. In addition, the expressions remote control, remote controller, and remote control device are used interchangeably, unless the difference is noted or made otherwise clear from the context.

Referring more particularly to the drawings, FIG. 1 is a simplified schematic diagram of a generalized remote control system 10. The system 10 includes a controlled system 20 and a remote control 15, connected by a link 25. The link 25 can be a wireless link, such as an IR, ultrasound, or RF link. Although the arrow representing the link 25 is unidirectional, pointing from the remote control 15 to the controlled system 20, in practice, the link can be bi-directional carrying data in the reverse direction as well. The data carried in the reverse direction, i.e., from the controlled system 20 to the remote control 15, can include, for example, alarm data, status data, alive and well messages, clock synchronization signals, and diagnostic data.

Figure 2:
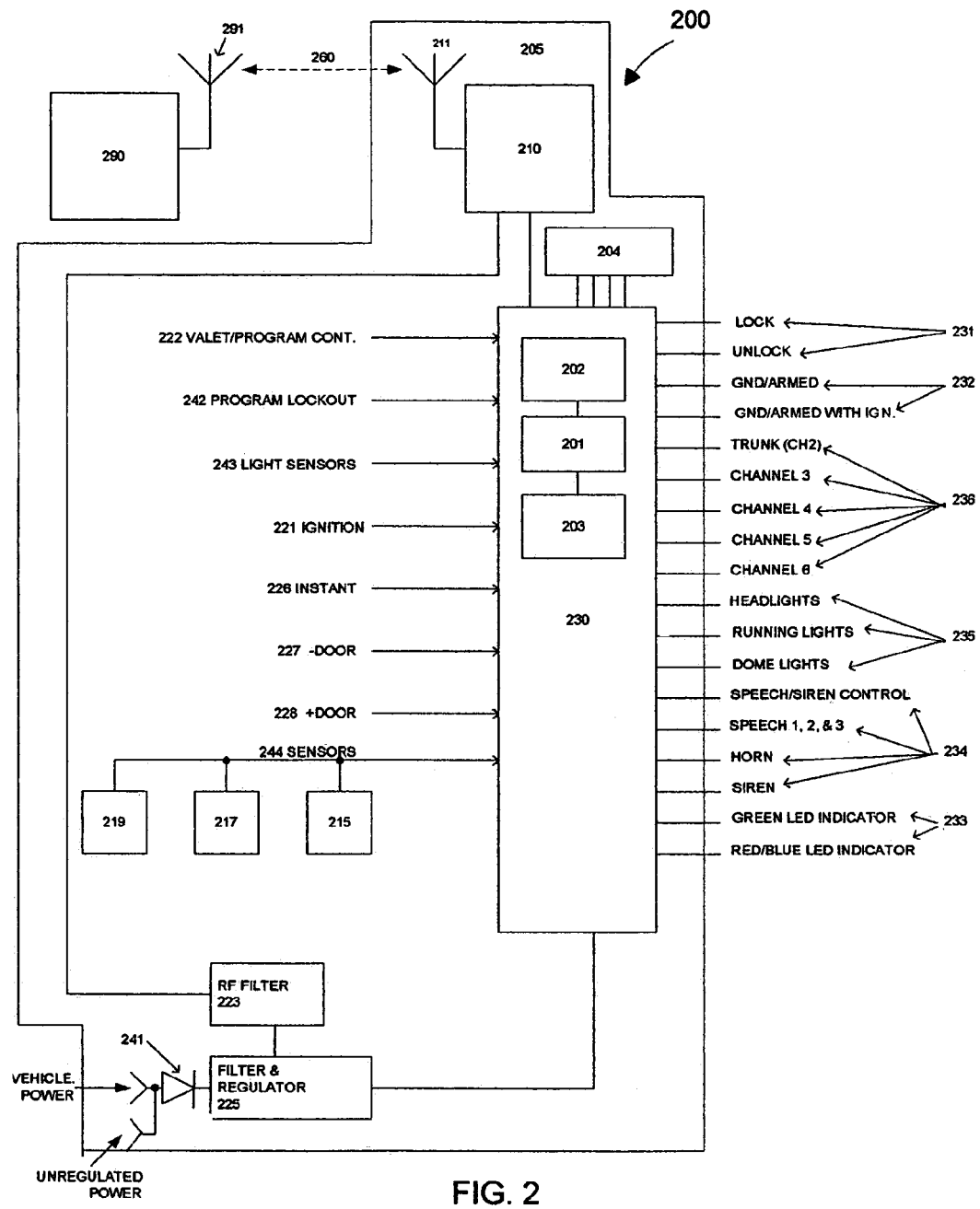
FIG. 2 is a simplified schematic diagram of a remote control automotive security system in accordance with the present invention.

FIG. 2 is a simplified schematic diagram of a remote control system configuration of an advanced vehicle security system 200. As illustrated, the system is made up of a remote controller 290 with its associated antenna 291, a wireless link 260, and a controlled system 205 (drawn within the dotted lines) that includes the remaining components shown in FIG. 2. The remote controller 290 can be a controller used to operate the controlled system 205, or a remote programmer, for example, a programmer such as described in the copending U.S. application Ser. No. 10/236,716, filed Sep. 6, 2002, used to program and configure the controlled system 205. Some embodiments of the remote controller 290 can perform both tasks, i.e., remote programming and remote control.

The controlled system 205 includes a base controller 230; a base transceiver 210 with its antenna 211; power supply components 225, 223, and 241; sensors 215, 217, and 219; and various additional inputs and outputs. The base controller 230 includes a processing unit 201, a non-volatile instruction memory 202, and operation memory 203. In the described embodiment, the base controller 230 is implemented as a microprocessor 201 with internal memory modules 202 (ROM) and 203 (RAM). As illustrated in FIG. 2, an external non-volatile memory device 204, such as an electrically erasable programmable read-only memory (EEPROM), can supplement the microprocessor memory, storing, for example, field-configurable control data and remote controller codes.

The base transceiver 210 communicates with the remote controller 290 over the link 260. Thus, the base controller 230, which is coupled to the transceiver 210, can communicate with the remote controller 290 through the base transceiver 210 and the link 260. Although in the described embodiment the link 260 is shown as a bi-directional link, in some alternative embodiments the link 260 is unidirectional, carrying commands from the remote controller 290 to the base controller 230, but not in the opposite direction; in such embodiments, a simple receiver can perform the necessary functions in place of the transceiver 210.

The power subsystem includes a protection diode 241 that isolates the vehicle's power system from the controlled system 205, a filtering and regulating module 225 that produces a clean power supply voltage for the controlled system 205, and a filter 223 for keeping the high frequency voltage variations produced by the transceiver 210 from affecting the rest of the controlled system 205.

The sensors of the described device 205 include a shock sensor 215, a field disturbance sensor 217, and a glass break sensor 219. Any other sensors appropriate to an automotive security system (or another installed environment) can be included as well.

Among the additional inputs to the controlled system 205 are these: +/− door inputs 228 and 227; a light sensor input 243; a valet/program control switch input 222; an ignition input 221; and a program lockout input 242, intended to prevent both accidental and intentional (subversive) programming of the controlled system 205, and programming of the remote controller 290 through the controlled system 205.

Lines 231 through 236 provide the following signal and control outputs:

Power door lock and unlock outputs-231;

Ground when armed and ground when armed-plus-ignition outputs for starter interrupt-232;

LED indicator outputs-233;

Speech, horn, and siren outputs for audible alarms and warnings-234;

Headlights, running lights, and dome light outputs-235; and

Channels 2 (trunk), 3, 4, 5, and 6 auxiliary outputs-236.

In a version of the remote control system embodiment illustrated in FIG. 2, the controlled system includes remote start capability that uses additional inputs and outputs to enable the controlled system to start the vehicle. In this embodiment, the controlled system 205 includes inputs for a tachometer, neutral sense, brake, hood (this can be an input to the security section of the system), and remote start activation. Some of the added outputs are as follows: a starter output; ignition output(s); and accessory output(s) for controlling the heater, air conditioner or any other vehicle function.

Figure 3:
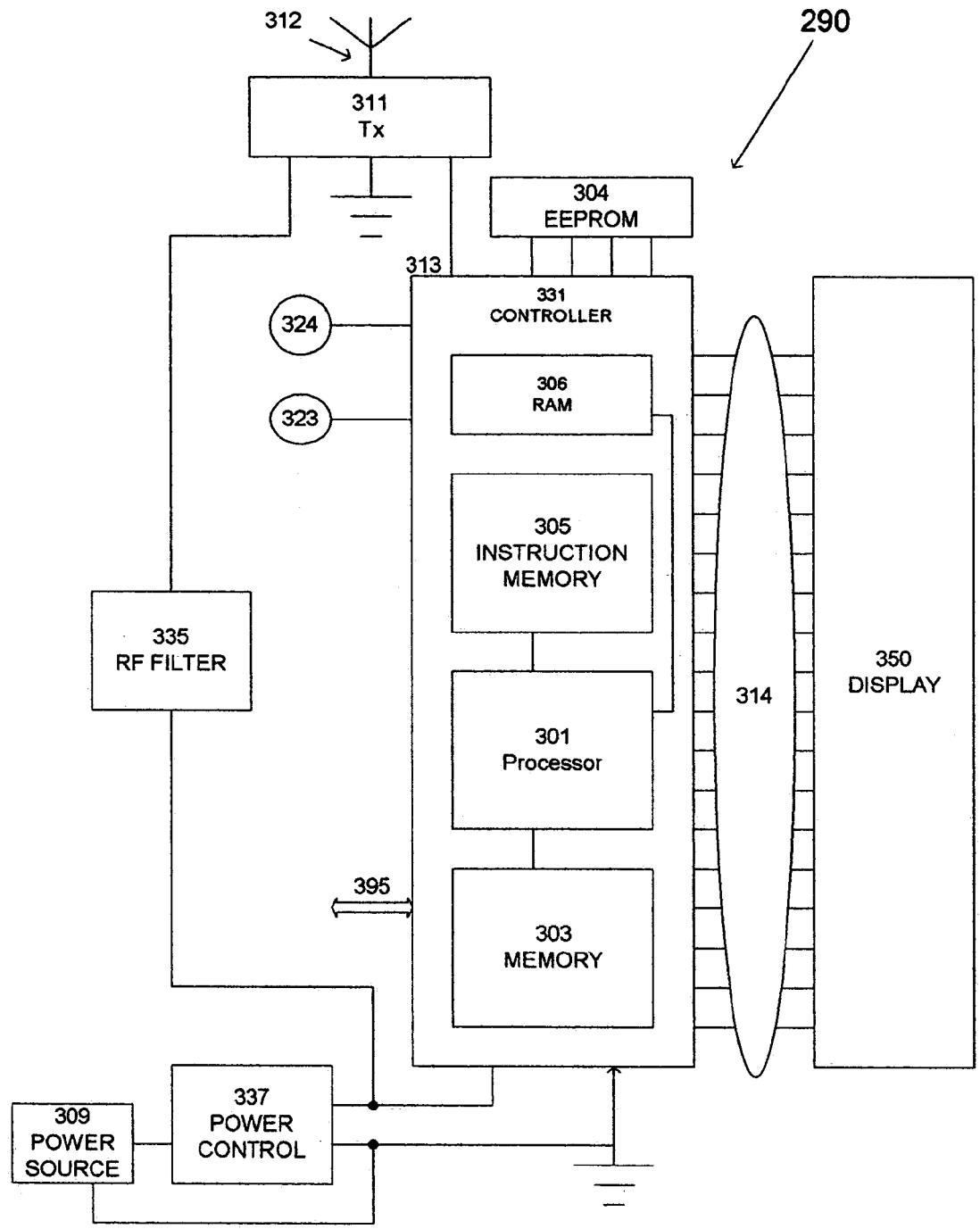
FIG. 3 is a simplified schematic diagram of a remote controller in accordance with the present invention.

FIG. 3 illustrates a simplified block diagram of a version of the remote controller 290 built on the platform of a controller 331, which can be, for example, a microcontroller (MCU), a microprocessor, or an application-specific circuit. In the specific embodiment of FIG. 3, the controller 331 is a microcontroller. It includes a processing unit 301; random access memory 306 for use as operating registers, address registers, and for other data storing functions during program execution; and memory modules 303 and 305 for storing program instructions and data. The memory modules 303 and 305 can be, for example, read only memories (ROMs), programmable ROMs (PROMs), electrically programmable ROMs (EPROMs), and electrically erasable PROMs (EEPROMS). The memory module 305 is typically used to store program instructions and constants. In the embodiment of FIG. 3, the memory module 303 is a non-volatile, re-writable memory module, such as Flash, EEPROM, or low-power battery-backed memory. It is used to store programmable control and configuration data, such as icon definitions and menu lists, for the functional routines of the remote controller 290.

Numeral 395 designates a port through which the remote controller 290 can receive its own operating software and configuration parameters. In the embodiment of FIG. 3, the port 395 is a custom serial data port. In other embodiments; the port can be implemented, for example, as a Universal Serial Bus (USB), an RS 232 serial port; as a parallel port; as a wired or wireless (e.g., IR, RF, ultrasound) network connection to the WAN (Internet), LAN, intranet, or extranet; as a memory storage reader device; or as a receiver, transceiver, modem, or another communication interface device.

Using the port 395, a user of the remote control 290 can download new icons from, for example, a personal computer, a personal digital assistant (PDA), or a network, either directly or through an intermediary mechanism. One version of the remote controller 290 receives complete software updates through the port 395. In another version, the remote controller 290 is programmed, through the port 395, to operate additional one or more controlled systems. Thus, when the controlled system 205 is retrofitted with new components operable or configurable by the controlled system 205, the controller 290 can receive software and/or configuration parameters patch to enable it to control the new components through the controlled system 205.

In one particular embodiment, the controller 290 receives, through the port 395, software and/or configuration parameters that allow the user to configure remotely an audio amplifier installed in a vehicle with a security system operable by the controller 290. In another embodiment, the controller 290 receives software and/or configuration parameters that allows the user to employ the controller 290 as a remote control for a video entertainment system connected to a vehicle security system operable by the remote controller 290. In yet another embodiment, the controller 290 receives software and/or configuration parameters that allow the user to configure and operate, through the controller 290, a vehicle locator and a Global Positioning System connected to the vehicle security system operable by the controller 290.

The controller 331 also has an input-output (I/O) section that provides the controller 331 with capability to read inputs and drive outputs under program control. The inputs of the I/O section of the controller 331 include connections to a scroll switch 324 and to a selection switch 323. The outputs of the I/O section include the outputs 314 for driving a display 350. Input/ouput lines 313 are used to activate and send data to remote controller 290 transmitter/transceiver and lines to interface with external non-volatile memory 304 (EEPROM).

The display 350 is part of the user interface of the remote controller 290. It can be a graphical or an alphanumeric display. In this particular embodiment, the display 350 is a dot matrix liquid crystal display (LCD). In another embodiment, the display 350 is a fixed-icon LCD.

The transceiver 311 can accept any data for transmission to the transceiver 210 of FIG. 2. As mentioned previously, the link 260, over which the transmitter 290 and the transceiver 210 communicate, can be an RF, IR, ultrasound, or another kind of link. The nature of the link 260 dictates the specifics of the transceiver 311 and the transceiver 210. In one possible embodiment, the link 260 is implemented as a Bluetooth link, and thus the transceiver 311 and the transceiver 210 are Bluetooth-compliant components.

The selection/activation and scroll switches 323 and 324 are also part of the graphical user interface of the remote controller 290. The scroll switch 324 can be any mechanism capable of directing the controller 331 to advance the display 350 from one menu item to another. In particular, the scroll switch 324 can be (1) a push-button switch; (2) a toggle switch, momentary or not; and (3) a rocker switch, momentary or not. Other types of switches that can be used to scroll through a menu, such as up-down and left-right switches, are also acceptable for use as the scroll switch 324. Moreover, the scroll switch 324 is not limited to being a "switch": it can be a scroll wheel, roller ball, eraser head, joystick, steering lever, key control, pocket PC mouse, or a touch screen with stylus pen input device.

The selection switch 323 can be a user operable standalone switch chosen among the kinds of switches listed above in connection with the scroll switch 324. But the selection switch 323 can also be built into most, and probably all, of the scrolling, devices, including these: scrolling wheels, roller balls, eraser heads, joysticks, steering levers, key controls, and touch screens. Indeed, the selection switch 323 and the scroll switch 324 can be integrated in a single device, as was done in the embodiments illustrated in FIGS. 9-10. In these embodiments, the scroll/selection switch assembly has a scroll wheel with an internal push-to-activate switch. The scroll wheel can be rotated in either direction to scroll through the menu items displayed on the display 350. When the user reaches the menu item corresponding to the function that the user wishes to activate, the user pushes down on the scroll wheel, changing the state of the internal push-to-activate switch. The controller 331 senses the change in the state of the internal switch, and sends a command to the controlled system 205 to operate an internal function or to send commands through the transceivers 311 and 210, and the link 260. The command corresponds to the desired function, which the controlled system 205 performs when it receives the command.

For convenience in everyday use, the scroll/selection assembly can provide tactile and audible feedback to the user: the scroll wheel can click when it is rotated, with each click corresponding to advancement of the displayed menu to the next item; and the internal push-to-activate switch can click when it is depressed. The feedback can also be generated by other outputs of the remote control. For example, a change in the display, LED flashes, or a speaker or a buzzer can generate the audible feedback.

In one embodiment, the pressure needed to activate the internal switch is between about 1 and 6 times the pressure that a typical user needs to apply in order to rotate the scroll switch with a fingertip. In another embodiment, the pressure needed to activate the internal switch is between about 0.15 and 0.75 ounces.

Electrical power for the operation of the remote controller 290 comes from the power source 309. In the illustrated embodiment, the power source 309 is a primary or secondary (rechargeable) battery. Alternative power sources include any portable sources of power, such as fuel cells, solar cells, capacitors, and mechanical generators, hand- or otherwise-operated. Power conditioning circuit 337 is not required for most applications, but will be disclosed to cover applications where it may be useful. The power conditioning circuit 337 smoothes and regulates the voltage of the power source 309. Here, the power conditioning circuit 337 is a combination of a filter and a regulator. The filter portion of the circuit 337 can include capacitors, inductors, and resistors, while regulation is performed by a regulator, such as a buck, boost, or charge-pump regulator. In other embodiments, the circuit 337 can be built with a power supply supervisor chip that cuts the power to other components of the remote controller 290 when the supply voltage drops below a predefined threshold. Numeral 335 denotes an RF filter that isolates the transmitter/transceiver 311 from the power inputs of the remaining components of the remote controller 290. Filter 335 can be connected before or after the power conditioning circuit 337, and will be connected after power conditioning circuit 337 if power conditioning circuit 337 includes a boost or charge-pump regulator.

Figure 4:
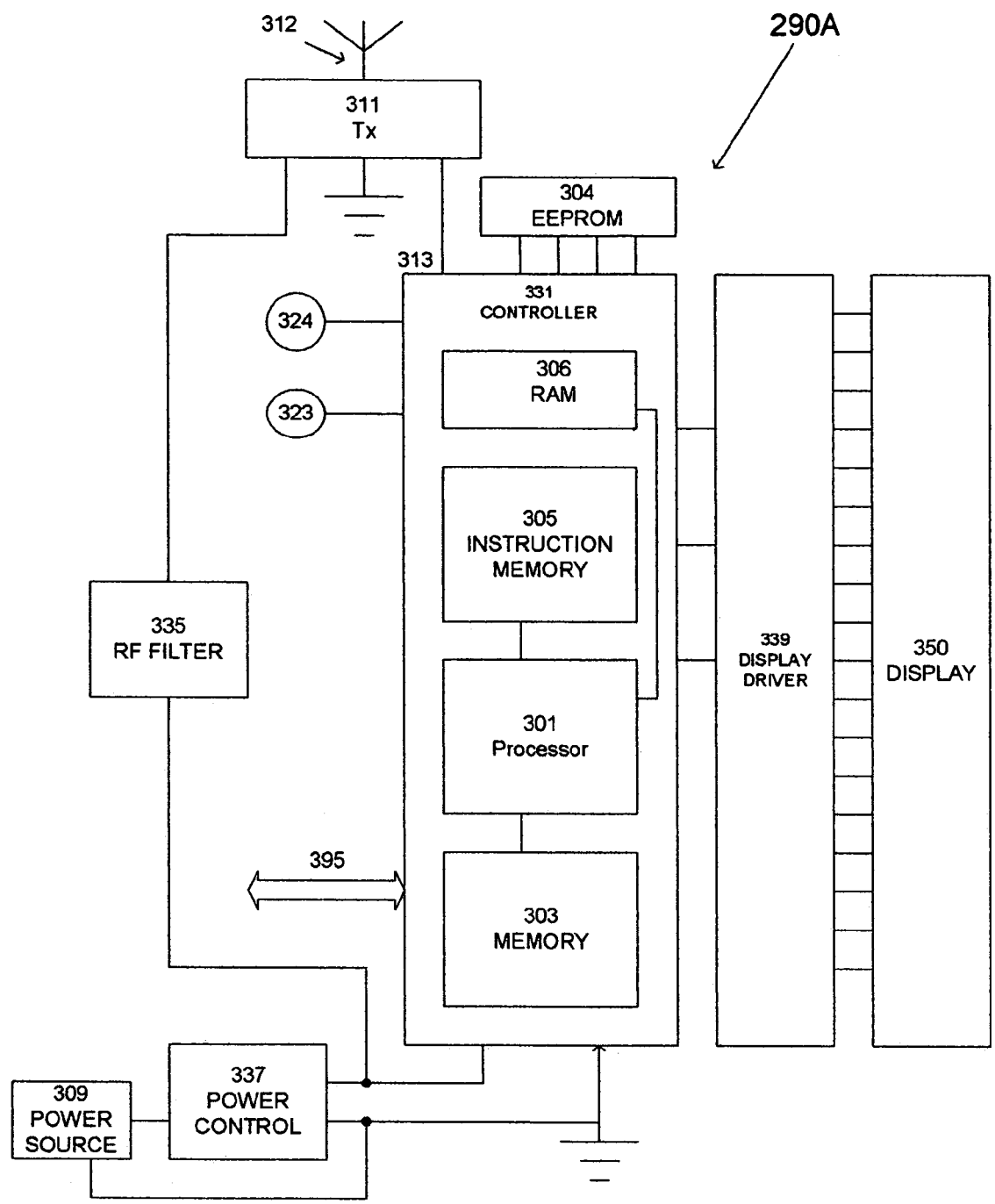
FIG. 4 is a simplified schematic diagram of a remote controller that includes a display driver, in accordance with the present invention.

FIG. 4 depicts an embodiment of a remote controller 290A that is similar to the remote controller 290 of FIG. 3. Most of the elements of the remote controller 290A illustrated in FIG. 4 are similar or identical to the elements of the remote controller 290 of FIG. 3. One difference between the two embodiments lies in the interface between the controller 331 and the display 350. In the remote controller 290, the controller 331 drives the display 350 directly; in the remote controller 290A, a display driver 339 is interposed between the controller 331 and the display 350. Thus, in the embodiment of FIG. 4, the controller 331 provides display data to the display driver 339, which in turn drives the display 350. This architecture frees up output driver(s) of the controller 331, allowing the use of a smaller device.

Figure 5:
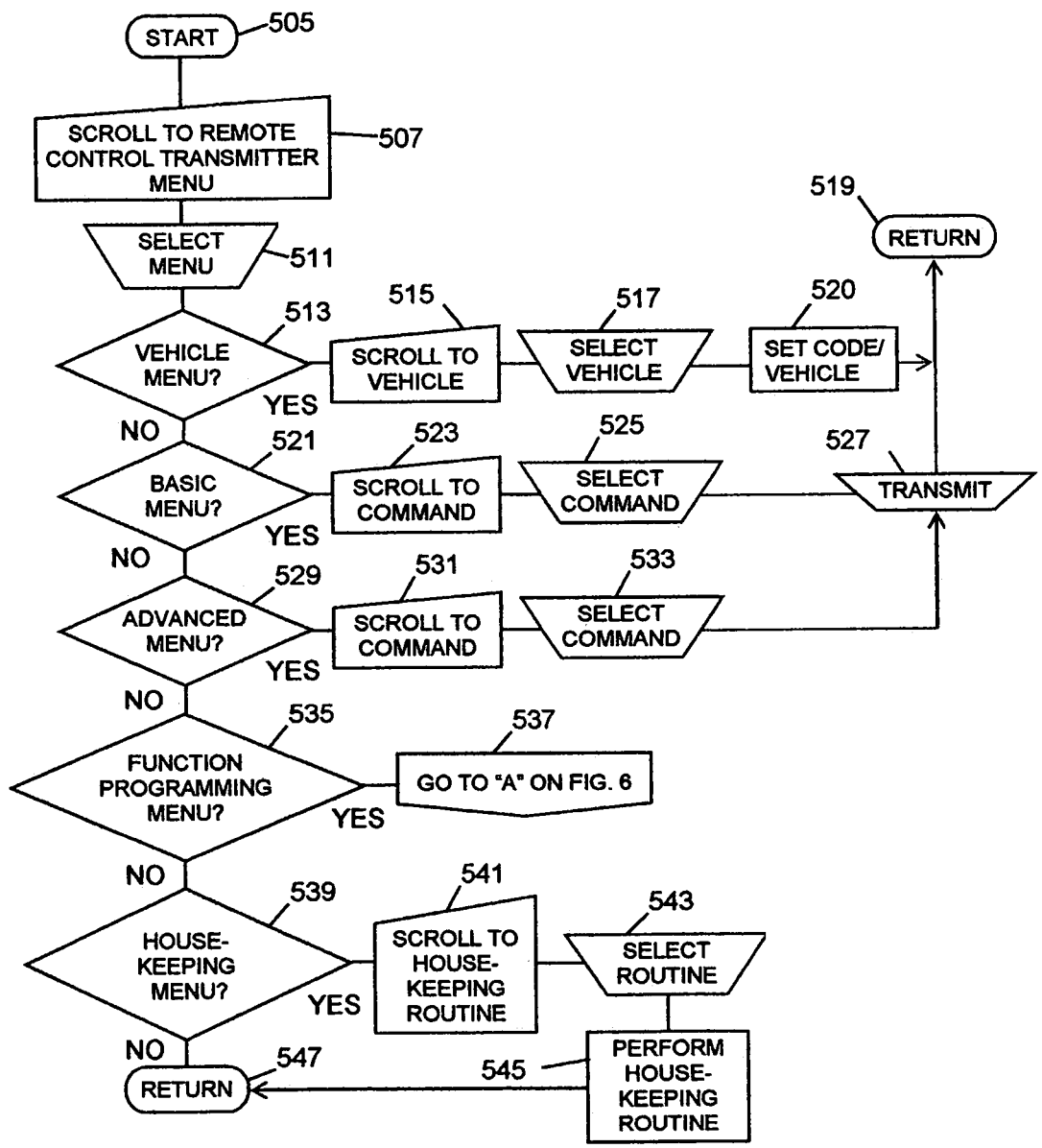
FIGS. 5 and 6 illustrate a high-level flowchart of some of the steps performed by a remote control of an automotive security system with feature (function) programming, in accordance with the present invention.

FIG. 5 is a high-level flowchart of some of the steps performed by a microcontroller, such as the controller of the remote controller 290 described above, of an automotive security system. Note that the user inputs to which the remote control responds in the course of performing the steps of the flowchart are manual inputs, made through, for example, a scroll wheel with a push-to-activate internal switch. The manual inputs can also be performed with 2 or more scroll switches—for example, scroll up, scroll down, scroll right, and scroll left switches—plus an activation/selection switch. For convenience, we will assume that the manual inputs are performed through a scroll wheel with a push-to-activate internal switch in describing this embodiment.

The remote controller 290 performs these steps after it enters an active state, for example, when it is turned on, or when it exits a low-power consumption state. The low-power consumption state, also referred to as sleep mode, is a state that the remote control enters (1) after a predetermined period of inactivity, (2) when a corresponding menu item is selected, or (3) when a special external switch is depressed. The remote control-exits this state when it detects activity on its inputs, including activity on the scroll and selection switches, or through an interrupt unrelated to switch activity. When the remote control exits the low-power consumption state, it can also resume at the step where the system was when it entered the low-power consumption state because of inactivity. Of course, the remote control can turn itself off completely after a period of inactivity, rather than enter a low-power consumption state.

After entering the active state at step 505 (sets parameters to run the main menu program), the remote control displays top-level menu choices to the user, as he scrolls through them at step 507. The menu choices can be displayed all at once, if the display has sufficient area and capacity to do so. In some alternative embodiments, the menu choices are displayed one or few at a time, allowing the user to scroll through them. In one of the alternative embodiments, at least one of the displayed choices occupies at least one half of the portion of the display capable of displaying menus. The user selects one of the top-level menu choices by scrolling through the displayed choices, and depressing the scroll wheel at step 511 after reaching the desired menu choice. The remote control then proceeds to determine which of the top-level menu choices has been selected, in steps 513, 521, 529, 535, and 539.

In one embodiment, the remote control requires movement of the scroll wheel before allowing selection of any menu item. This is a precautionary measure to prevent accidental reconfiguration or transmission of commands to the vehicle security system (the controlled system).

In the illustrated embodiment, the top-level choices include these choices:
(1) Vehicle Menu;
(2) Basic Menu;
(3) Advanced Menu;
(4) Function-programming Menu; and
(5) Housekeeping Menu.

Vehicle Menu, the first listed menu choice, includes a selection of vehicles whose security systems the remote control is capable of addressing. When the remote control determines, in step 513, that the user has selected the Vehicle Menu, the remote control displays the selection of vehicles as selected, at step 515. The user scrolls through the list and selects the desired vehicle by depressing the scroll wheel at step 517. At step 520 the remote control configures itself to access the selected vehicle's security system and to use the encryption codes corresponding to the selected vehicle. Once a particular vehicle security system is selected, the selection can remain stored in the programmable non-volatile memory of the remote control through battery changes or other power interruption events. This feature can be used with all other configuration choices to increase the ease of use and user-friendliness of the remote control system. After the remote control configures itself, it returns to the state of waiting for a top-level menu selection, at steps 519 and 507 via the start initiation routine at 505.

The second and third listed top-level menu choices are Basic Menu and Advanced Menu, respectively. Each of these choices represents a list of commands (menu items) to be transmitted to the selected vehicle security system. The remote control determines whether one of these menu choices has been selected at steps 521 and 529. After the remote control determines that one of these choices has been selected, the Basic Menu, for example, it displays the commands of the Basic Menu by the user scrolling through the list at step 523, and waits to receive the command selected by the user, at step 525. The user chooses a command from the Basic Menu using the scroll wheel with its internal switch, as described above in relation to making top-level menu selections. After receiving the user's command choice, the remote control transmits the command to the automotive security system at step 527, and returns to the beginning of the sequence at steps 519 and 507 via the start initiation routine at 505. Similarly, when the top-level choice is Advanced Menu, the remote control displays the Advanced Menu commands by the user scrolling through the list at step 531, receives the advanced command selection initiated by the user at step 533, and transmits the selected command: to the security system at step 527, returning to the beginning of the flowchart at steps 519 and 507 via the start initiation routine at 505.

In one embodiment in accordance with the present invention, the user is asked to confirm the choice of the Basic and Advance commands before the remote control accepts them at steps 525 and 533. The user confirms the choice by depressing the scroll wheel the second time. This "confirmation" feature can be present for fewer than all the commands in a menu. For example, the remote vehicle start command is a good candidate for the confirmation requirement, in order to minimize unintended starts of the vehicle.

Following is a list of Basic Menu Commands in one embodiment of a remote control in accordance with the present invention:
1. Arm/Disarm;
2. Arm;
3. Disarm;
4. Silent Arm/Disarm;
5. Silent Arm;
6. Silent Disarm;
7. Panic; and
8. Trunk Release.

(As a side note, the reason for having both a single toggling Arm/Disarm command and separate Arm and Disarm commands is that there are cases where an individual may forget whether or not the security system is armed. The separate Arm and Disarm commands enable the user to make sure that the system is put in the desired state by simply depressing a key on the remote control, without verifying the previous state of the security system.)

The same embodiment uses the following commands under its Advanced Menu:
1. Hood Release;
2. Arm Without Shock Sensor Input;
3. Arm Without Shock Sensor Full Alarm Trigger Input;
4. Arm Without Shock Sensor Warn-Away Input;
5. Arm Without Trunk Input;.
6. Arm Without Any Input Except Ignition Input;
7. Arm Without Any Input But Provide Starter Interrupt;
8. Valet On/Off (door open);
9. Auxiliary Channel 5 (output programmable in housekeeping mode or in program mode);
10. Auxiliary Channel 6 (output programmable in housekeeping mode or in program mode);
11. Auxiliary Channel 7 (output programmable in housekeeping mode or in program mode); and
12. Auxiliary Channel 8 (output programmable in housekeeping mode or in program mode).

The division between the commands of the basic and advanced menus is rather arbitrary and could be defined under a Housekeeping Menu item (described further below), or by the installer at the time of installation.

The programming of the auxiliary channel outputs will also be addressed further below.

The next top-level menu choice is the Function-programming Menu. This menu lists the commands available for remote programming (configuring) of the base controller of the automotive security system, such as the controlled system 205 in FIG. 2. The configuration data sent through the remote control can include, for example, the following optional feature alternates allowed by the security system: passive and active arming; enabling and disabling confirming chirps for arm and disarm state changes; and turning on and off ignition locking of doors. The remote control determines whether this top-level menu has been chosen at step 535. If the Function-programming Menu has been chosen, the remote control proceeds to the sequence of steps described further below in relation to FIG. 6.

The next top-level menu is the Housekeeping Menu. At step 539 the remote control determines that this menu has been selected and proceeds to display to the user the housekeeping routines that can be selected, by the user scrolling through the list at step 541. After the user selects the routine to be performed at step 543, the remote control receives the user's selection and performs the routine at step 545. The remote control then returns to the beginning of the sequence at steps 519 and 507 via the start initiation routine at 505.

A partial list of the housekeeping routines follows:
1. Download icons;
2. Download text menu items;
3. Select operation modes of the remote control, for example, whether command confirmation is enforced; and
4. Turn on the back lighting of the remote control's display.

The initial housekeeping choices can be programmed into the remote control at the factory or by a distributor, particularly if the remote control is sold together with a specific security system. But the user can still be able to reconfigure the remote control, for example, by downloading software and/or configuration parameters provided by the manufacturer or distributor. The provided configuration parameters can include files for generating various icons for display on the screen of the remote control. The configuration parameters can also configure the remote control for use with additional security systems or other controlled systems.

The sequences of the displayed menu items for each menu, and the sequence of the top-level menu items, can be dynamically adjusted. For example, the more frequently selected menu items can move to the tops of their lists, based on the relative frequencies of selection.

The flowchart of FIG. 5 is illustrative and does not imply that all steps must be performed, or performed in a rigid sequence. (Of course, this statement applies with equal force to other flowcharts of this document.) For example, in one alternative embodiment the remote control moves through all the different menu items sequentially, without the user being able to branch to select items from one of the lower-level menus. In yet another embodiment, a single menu is organized based on the frequency of the use of the menu items. In this embodiment, it is likely that the vehicle selection menu items would move to the bottom of the list if the user does not change vehicles often, and the arm/disarm choices would probably move to the top of the menu list on which they appear.

Figure 6:
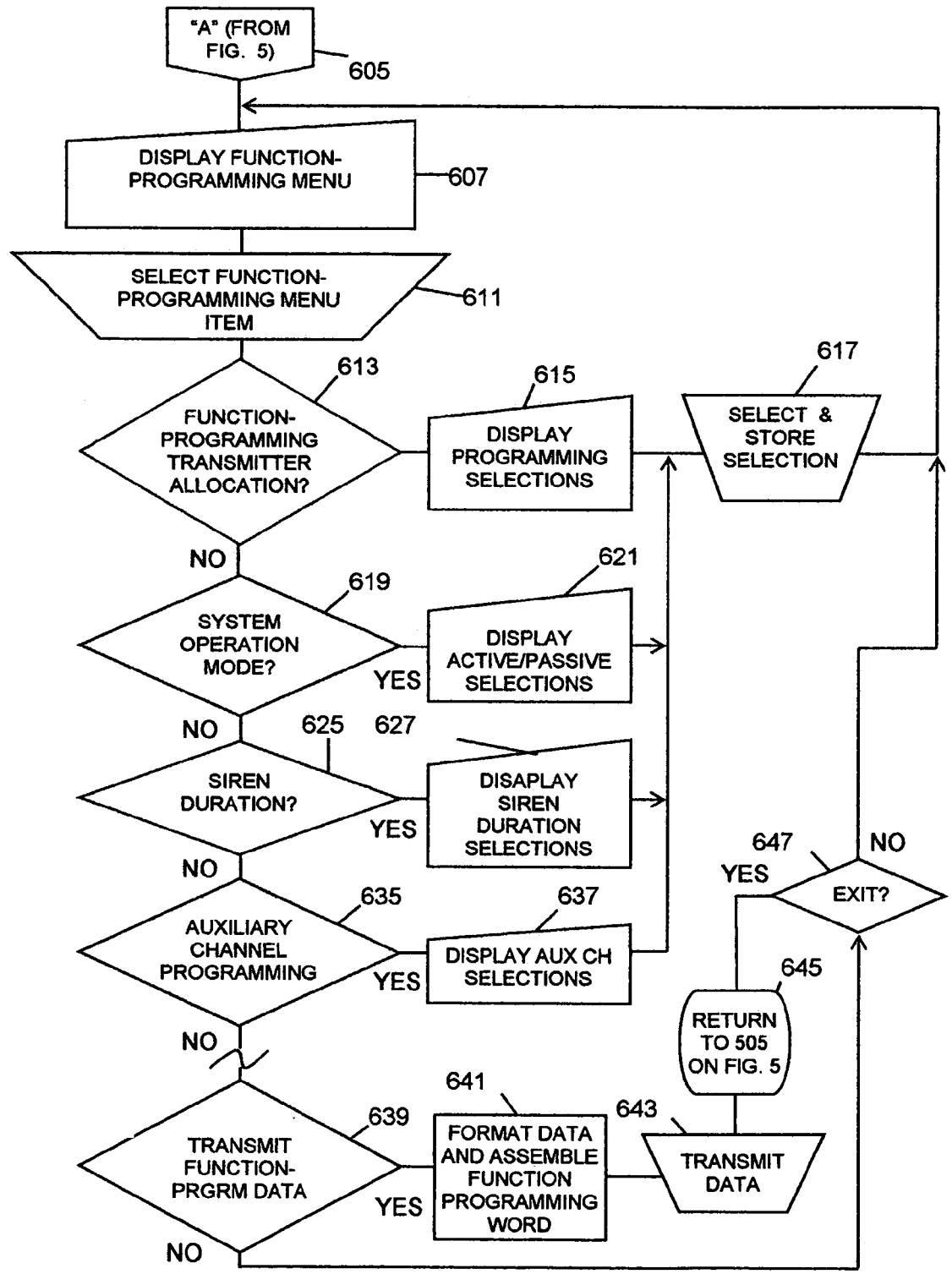

We now turn to FIG. 6 and function-programming, also known as feature programming. Tables 1 and 2, below, list a number of basic and advanced programmable features of one embodiment of a remotely controlled vehicle security system, with the features' default and alternative settings. For additional description of several programmable features the interested reader is referred to U.S. Pat. No. 4,922,224, hereby incorporated by reference.

TABLE 1

BASIC PROGRAMMABLE FEATURES

| Feature Number | Default Setting | Alternate Setting |
|---|---|---|
| 1-1 | Active arming | Passive arming |
| 1-2 | Chirps on | Chirps off |
| 1-3 | Ignition door locks on | Ignition door locks off |
| 1-4 | Active locking only | Passive locking |
| 1-5 | Panic with ignition on | No panic with ignition on |
| 1-6 | 0.8 second door lock pulse | 3.5 second door lock pulse |
| 1-7 | Forced passive arming on | Forced passive arming off |
| 1-8 | Automatic engine disable off | Automatic engine disable on |
| 1-9 | Armed While Driving (AWD) | Vehicle Recovery System |
| 1.10 | Code Hopping on | Code Hopping off |

TABLE 2

ADVANCED FEATURES

| Feature Number | Default Setting | Alternate Setting |
|---|---|---|
| 2-1 | Siren | Horn |
| 2-2 | Short siren/horn duration | Long siren/horn duration |
| 2-3 | Noise Pollution Control (NPC) on | NPC OFF |
| 2-4 | Progressive door trigger | Instant door trigger |
| 2-5 | Valet switch input: 1 pulse | Valet switch input: 2–5 pulses |
| 2-6 | Door trigger error chirp on | Door trigger error chirp off |
| 2-7 | Ignition/dome light ON | Ignition/dome light OFF |
| 2-8 | Single unlock pulse | Double unlock pulse |
| 2-9 | Channel 5 Validity | Channel 5 latched/latched reset with ignition/30 second timed/second door unlock output |

To give a better understanding of some of the listed programmable features, a brief explanation follows.

1-1 Active/Passive Arming

With active arming selected, the security system will arm only when it receives an arm command. When set to passive arming, the system will arm automatically after some predetermined time period (e.g., 30 seconds) after the last door of the vehicle is closed. To alert the user of passive-arming, the security system may emit an audible warning such as a chirp after the last door is closed but before the system arms itself (e.g. 20 seconds after the last door is closed).

1-2 Chirps On/Off

This feature enables and disables the chirps that confirm the arming and disarming of the system.

1-3 Ignition-Controlled Locking & Unclocking On/Off

When ignition-controlled door locking is turned on, the doors of the vehicle will lock in some predetermined period, e.g., three seconds, after the ignition is turned on; similarly, when ignition-controlled door unlocking is enabled, the doors will unlock when the ignition is turned off. The ignition-controlled locking and unlocking features can be programmed independently of each other.

1-4 Active/Passive Locking

If passive arming is selected (see programmable feature 1-1), then the security system can be programmed to lock the doors when passive arming occurs. Active locking means the system will not lock the doors when it arms passively, but only when it is manually armed, for example, by depressing the arm key on the remote control. Passive locking means that the system will also lock the doors when it arms automatically in the passive arming mode.

1-5 Panic With Ignition On

This feature determines whether the Panic Mode is available with the ignition on. Some state laws prohibit a siren from sounding in a moving vehicle. Turning this feature off makes the security system comply with the law of these states.

1-6 Door Lock Pulse Duration

The default setting for the door lock and unlock pulse duration is relatively short, with 0.8-second duration being typical. Some vehicles, however, require longer lock and unlock pulses. Programming the security system to provide longer pulses, e.g., 3.5 seconds, accommodates the door lock systems in these vehicles.

1-7 Forced Passive Arming On/Off

When turned on forced passive arming ensure that the system will passively arm even if a zone, for example a door, is left open or invalid. Forced passive arming occurs some time period after the vehicle's ignition is turned off. The time period is typically rather long, e.g., one hour. To use this feature, passive arming is enabled (see feature 1-1).

1-8 Automatic Engine Disable (AED) On/Off

AED is a full-time, passive starter disable that works independently of the security system. When turned on, ground-when-armed output will become active some short time period, e.g., 30 seconds, after the ignition is turned off. The system's LED will flash at a slower than normal rate when the ignition is turned off to indicate that the AED is active, and will interrupt the starter in 30 seconds. The AED does not occur in valet mode and can be bypassed using the emergency override procedure of the security system. The transmitter can be used to disarm the AED.

1-9 Armed While Driving/Vehicle Recovery System

In the default setting (Armed While Driving), the system can be armed with the ignition on. When so armed, the ground-when-armed is not active and some sensors are bypassed. The door sensors, however, remain active. If a door is opened while the ignition is on, alarm and a vehicle recovery system (when installed) are activated.

1-10 Code-Hopping On/Off

The system uses an algorithm to change part of its code each time the transmitter and receiver communicate. This variable code approach is often referred to as a "rolling code" or code-hopping. The longer the code, however, the more difficult is reliable reception. Disabling the code-hopping feature allows the receiver to ignore the code-hopping part of the transmitted code word, making reception more reliable and extending the range of the transmitter.

2-1 Siren/Horn Honk

Toggling this feature selects either a siren or optionally the vehicle's factory-installed horn, and pulses the output to prevent damage to the horn.

2-2 Short or Long Siren/Horn Duration

This feature allows selection between short and long siren duration in response to a triggering sequence (alarm). The short and long siren duration can be about 30 and 60 seconds long, respectively.

2-3 Nuisance Prevention Circuitry (NPC) On/Off

Some states have laws regulating the number of times a security system can trigger before it is considered a nuisance. To accommodate these laws, NPC, when turned on, stops repeated triggering of the same alarm zone. For example, if one zone is triggered three times in one hour, that zone is bypassed for one hour. During the hour when the zone is bypassed, if the system detects a trigger on that zone again, the system resets the one-hour timer. If the hour passes and the zone has not triggered again, the zone is reactivated and can trigger the system alarm again. Generally, NPC monitors only sensor and instant inputs (e.g., hood, and trunk), and does not bypass the door or ignition triggers. If NPC is turned off the system responds indefinitely to repeated triggers.

2-4 Progressive Door Trigger On/Off

Enabling the progressive door trigger feature directs the security system to respond progressively to a door trigger input. When the door is opened with the system armed, the siren first chirps a few times (e.g., 10 times), before responding in a full-triggered sequence. The door trigger is still treated as an instant trigger, so that closing the door quickly does not prevent a full-triggered sequence from occurring. If the progressive door trigger is disabled, the full siren output occurs immediately after the door sensor is triggered.

2-5 Valet Pulse Setting

The system can be programmed to count the number of activations of the valet switch, and to disarm the security system or the vehicle recovery system (VRS) after a preset number of activations. The factory default setting is usually one pulse.

2-6 Door Trigger Error Chirp On/Off

With the door trigger error chirp programmed off, the security system does not report an invalid zone upon arming, eliminating the extra chirps in vehicles with long dome light delay periods.

2-7 Ignition-Controlled Dome Light Supervision On/Off

If this feature is enabled, the security system turns on the dome light for a preset period, 30 seconds, for example, when the ignition is turned off.

2-8 Double Pulse Unlock On/Off

Some vehicles require two pulses on a single wire to unlock all vehicle doors. Turning the double pulse unlock feature on allows the security system to unlock all the doors when the system is disarmed.

2-9 Channel 5 Validity/Latched/Latched Reset With Ignition/30/60/90 Second Timed/Timed Other/Linked (Valid) ity)

Channel 5 can be programmed for these output configurations. The unit is set to the default validity output. To change the configuration, use the two-chirp setting to toggle to the different configurations.

The remote control displays the main function-programming menu to the user when the user scrolls through the menu at step 607 of the flowchart of FIG. 6. (The user can be an installer.) After the user selects a particular function-programming menu at step 611, the remote control receives the selection. The remote control determines, whether the user has selected the transmitter allocation, system operation, siren duration, or auxiliary channel menu, in steps 613, 619, 625, and 635, respectively. (We will refer to these menus as second-level function-programming menus.) If one of these second-level function-programming menus has been selected, the remote control displays the menu items by the user scrolling through the menu at steps 615, 621, 627, or 637, as the, case may be. Once the user makes the selection from one of the second-level function-programming menus, the remote control receives and stores this second selection as selected by the user at step 617, and returns to displaying the main function-programming menu at step 607.

Note that many other second-level function-programming menus can be made available to the user. This is represented by the break in the line connecting steps 635 and 639.

The process of selecting a different item from one of the second-level function-programming menu items is repeated until the remote control detects, at step 639, that the user has selected the transmit programming data menu. After receiving and detecting the transmitted function-programming data input at step 639, the remote control proceeds to format the programming data and assemble the data into a function-programming command word, at step 641. The remote control displays a confirmation request message to the user, and transmits the command word only after receiving a confirmation input from the user. In an alternative embodiment, the remote control 290 then transmits the command word to the controlled system at step 643 without confirmation. After transmitting the command word, the remote control reverts to the beginning of the flowchart for remote controller 290 at step 645.

If the user decides not to change the function-programming data, the user selects the exit menu item at the second-level function-programming menu, and is returned to the beginning of the flowchart for remote controller 290 at steps 647 and 645.

As can be seen from the description of the flowcharts of FIG. 6, the programmable features can be reprogrammed individually, one-by-one, or in groups.

In the illustrated embodiment, there are user-selectable programmable features and installer-selectable programmable features. The delineation between user- and installer-programmable features is not unique. In one embodiment, the installer-selectable features are features whose improper programming can adversely affect the safety of the system or of the installed environment—a vehicle, a house, for example—or that can damage the system or the installed environment. Consequently, these features are protected from being changed by a person without knowledge of the code that secures the installer-selectable features.

The following is a partial list of installer-selectable features in the described embodiment:

1. Single versus double unlock pulse;
2. Duration of door lock and unlock pulses;
3. Door ajar warnings (delayed dome light, door error trigger chirp on/off);
4. Tachometer or voltage input for remote start (gasoline or diesel);
5. Auxiliary output(s) setup (validity—output as long as remote controller 290 is activated; latched—the output is latched on or off until another input from the remote controller 290 is received on the channel so programmed; latched output that is on until it goes off at ignition on and then off within a predetermined period, or timed; user recognition—set up user recognition to tailor system accessories, such as vehicle seat position, steering column position, and audio system settings, to the preferences of a specific user).

Figure 7:
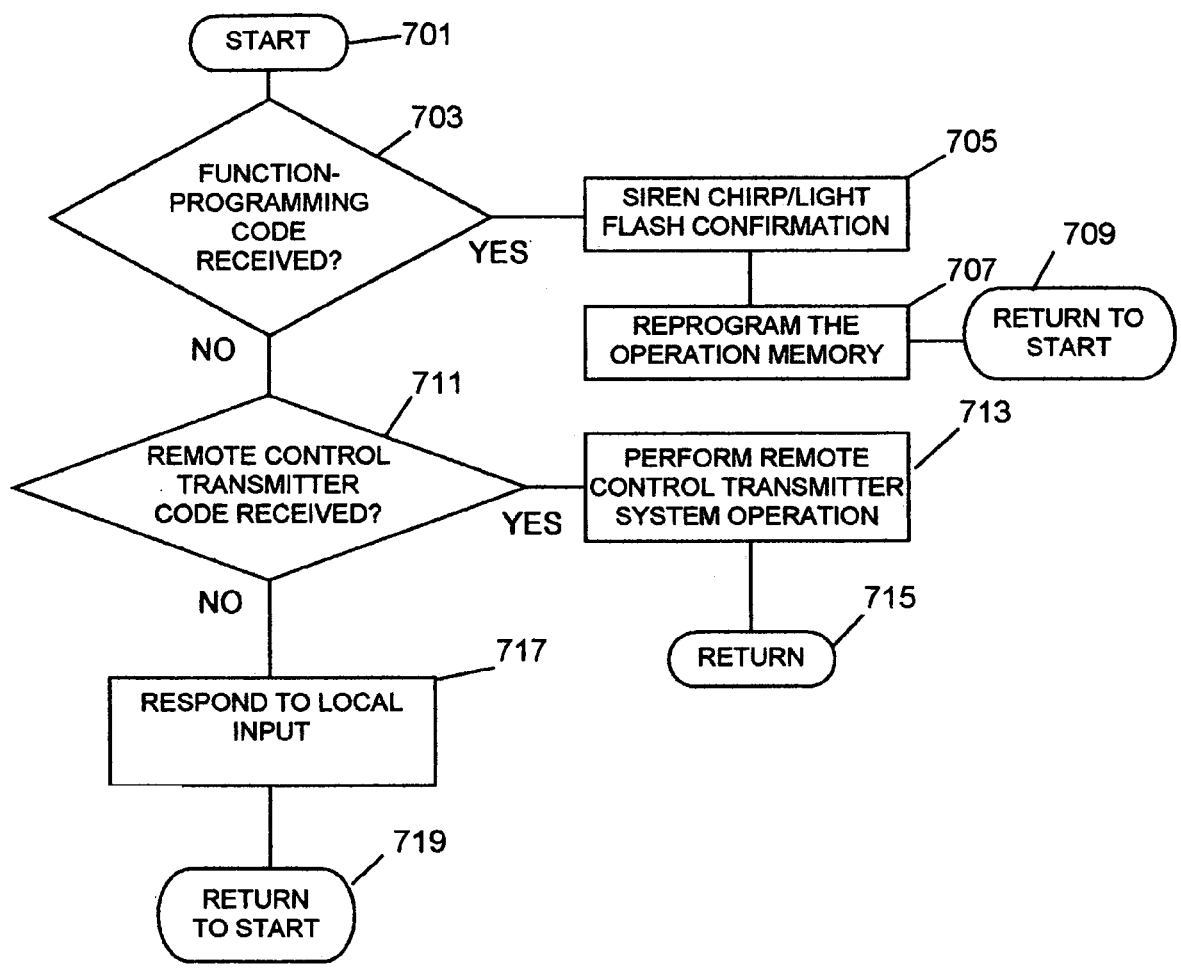
FIG. 7 is a high-level flowchart showing some of the steps executed by a controlled system of a remote control system in accordance with the present invention.

FIG. 7 is a high-level flowchart illustrating some of the steps executed by the controlled system while the controlled system monitors remote control commands, remote control programming commands, and local sensor inputs in the main program loop.

Beginning at step 701, parameters are set to run the main program loop. At step 703, the controlled system tests the received input to determine whether it is a remote function-programming command. If a remote function-programming command has been received, the controlled system emits a receipt acknowledgement at step 705. The acknowledgement can be, for example, a preprogrammed audible or visual indication, such as chirp(s) or a sequence of blinking lights, or both. At step 707, the controller of the controlled system, for example, controller 331 of FIG. 3, modifies the programmable function settings in the memory of the controlled system based on the received function-programming command. Program flow is then returned to the beginning of the flowchart, at steps 709 and 701.

If the input received by the controlled system is not a function-programming command, the controlled system proceeds to step 711. At this step, the controlled system tests the received input to determine whether it is an operational command, i.e., a control command. If indeed an operational command has been received, then the controlled system performs the operation indicated by the received command, at step 713. The operational command can be, for example, an arm, disarm, or panic command. After performing the operational command, program flow is returned to the beginning of the flowchart at steps 715 and 701.

If the received input is not a remote command, the controlled system interprets the local input received and performs the routine responsive to the received input at step 717. As in the cases of the remote commands, the program flow is returned to the beginning of the flowchart, at steps 719 and 701.

Figure 8:
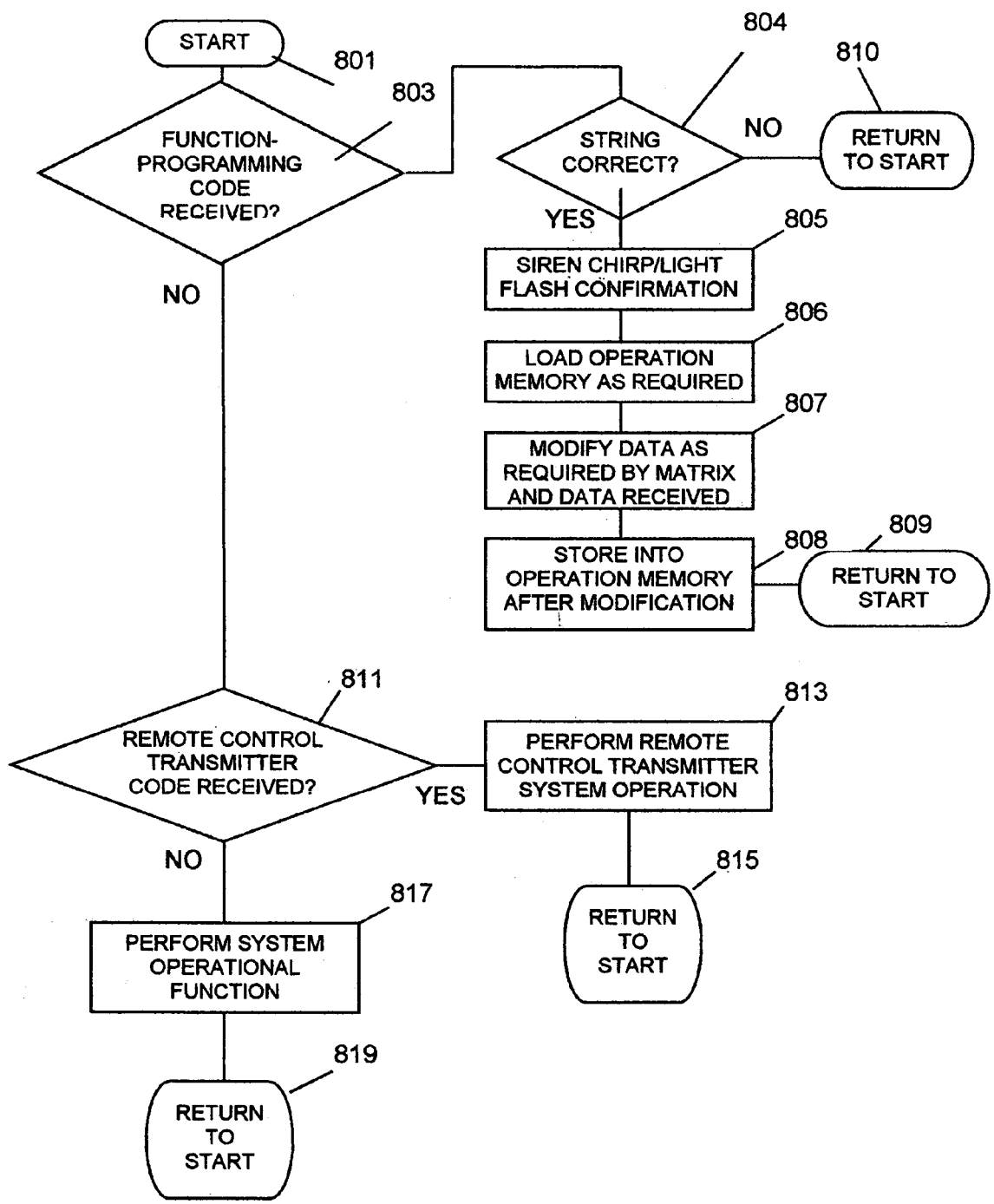
FIG. 8 is a high-level flowchart showing some of the steps executed by an embodiment of a controlled system of a remote control system using matrix programming method for transmitting function-programming commands, in accordance with the present invention.

FIG. 8 is a high-level flowchart illustrating some of the steps executed by an embodiment of a controlled system of a remote control system using matrix programming method for transmitting function-programming commands. The matrix programming method is described in U.S. patent application Ser. No. 10/236,716. At the level of abstraction of the present discussion, the steps illustrated in FIG. 8 are substantially similar to the steps of the flowchart of FIG. 7, with the major differences being the expansion of step 707 into steps 806, 807, and 808; and addition of steps 804 and 810.

Beginning with step 801, the controlled system monitors remote commands and local inputs. At step 803, the controlled system checks whether a received input is a remote function-programming command. If a function-programming command has been received, the controlled system verifies the command string at step 804. For an incorrect string (a string that does not match preprogrammed parameters for such strings), either no acknowledgement is sent, as illustrated, or a negative acknowledgement is sent, and the program flow is returned to the beginning of the flowchart at step 810. When the string is correct (i.e., matches the preprogrammed parameters), the controlled system sends a siren chirp/light; flash acknowledgement at step 805. At step 806, the controller of the controlled system loads function-programming data from the operation memory of the controlled system into the temporary memory of the controlled system, as indicated by the transmitter allocation code. At step 807, the function-programming data is modified according to the function-programming data of the received command. The function-programming data is then written back into the memory at step 808, and the program flow is returned to the beginning of the flowchart, at step 809.

The remaining steps (811, 813, 815, 817, and 819) of the flowchart of FIG. 8 are similar to the like-numbered steps of the flowchart on FIG. 7 (711, 713, 715, 717, and 719), and are discussed above.

Figure 9:
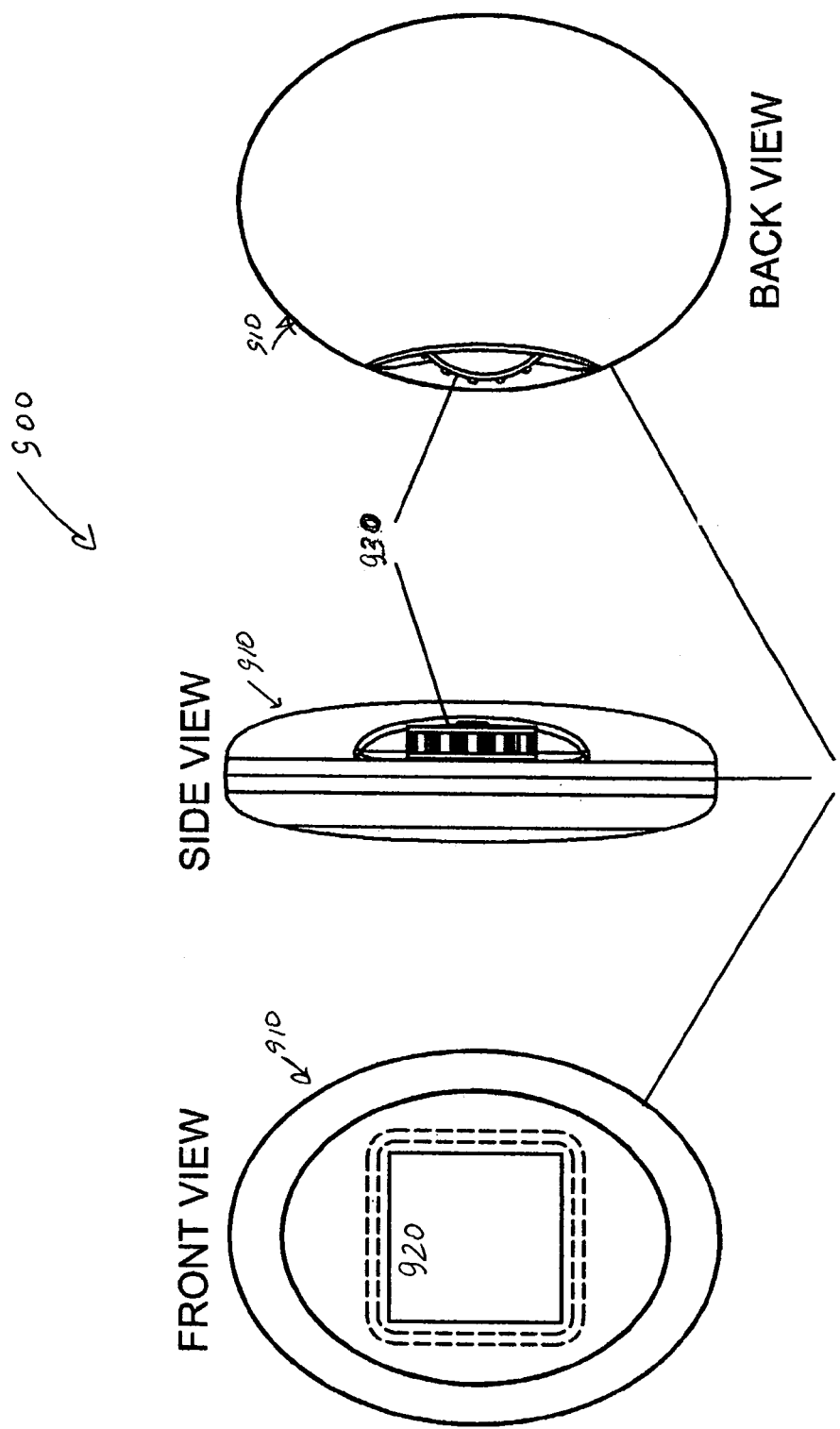
FIG. 9 shows top, side, and bottom views of an embodiment of a remote controller in accordance with the present invention.

FIG. 9 shows three views of a remote controller 900 in accordance with the present invention: a top (front) view, side view, and bottom (back) view. The remote control 900 has an outer shell (housing, case) 910 with a dot matrix LCD screen 920 disposed on the front of the outer shell 910. A scroll wheel with internal push-to-activate switch 930 is mounted in a recess on the left side (as viewed from the back of the remote control 900) of the shell 910, toward the rear of the outer shell 910. In one embodiment, the size of the outer shell 910 is such that it fits comfortably in the hand of a typical user, with the horizontal dimensions of the oblong or round shell 910 being less than about 2 inches along the longer axis, and less than about 1.5 inches along the shorter axis, sodas to fit comfortably in a garment pocket. In another embodiment, the shell 910 is less than about 6 inches in its longest dimension. The user can hold the remote controller in the right hand, scroll through the menus displayed on the screen 920 by rotating the scroll wheel 930 with his or her right thumb, and select menu items by depressing the scroll wheel 930 with the same thumb.

The display 920 can be inverted by selecting and activating a menu list item that sets an indicator and initiates a software inversion of the displayed menu items. In essence, the information displayed on the screen 920 is flipped bottom-up. When the display 920 is so inverted, the remote controller 900 can be held in the left hand and operated by the left-hand thumb while the items are normally displayed on the screen 920. The remote control 900 is thus easy to use by both right- and left-handed users. Similiarly, the remote controller 900 display can be inverted mechanically by rotating the back of the shell and the transmitter printed circuit board with the display 180 degrees (shell must be designed for this application).

In an embodiment of the remote control in accordance with the present invention, the menu items displayed on the screen 920 are large enough so that only a single menu item is displayed at one time. For example, the size of at least some of the displayed icons or text can exceed one half of horizontal or vertical dimension of the screen. Therefore, when the user scrolls through the menu items, the user sees only one item at a time. In addition, no mechanical input devices are found on the outer shell 910, besides the scroll wheel with internal push-to-activate switch 930. In this way, the remote controller 900 can be made relatively small and still provide a readable display and a finger-operable control input.

The selection and activation of menu items of the remote controller 900 can take one, two, or even more steps. In one embodiment, for example, the user selects the desired menu item by moving it onto the display 920 until it is the highlighted item or at the item pointer (the item pointer can be a fixed indicator on the display or a protrusion on the shell); then depresses the scroll wheel 930 to perform the operation associated with the selected menu item. In another embodiment, the user depresses the scroll wheel 930 to initiate the selection of the menu items, and then depresses the scroll wheel 930 again to perform the operation associated with the selected menu item.

In general, the menu items available to the user of the remote control 900 can include (1) remote commands, i.e., commands to be sent to the controlled system, and (2) local commands, to be performed internally by the remote control 900. When the user selects a remote command, the remote control 900 assembles the data to be sent to the controlled system, optionally encrypts the data, and sends the data to the controlled system over an associated transmission channel. When the selected command is a local command, such as an internal operational or housekeeping function, the controller performs the function, as is exemplified by the display inversion instance above.

Figure 10:
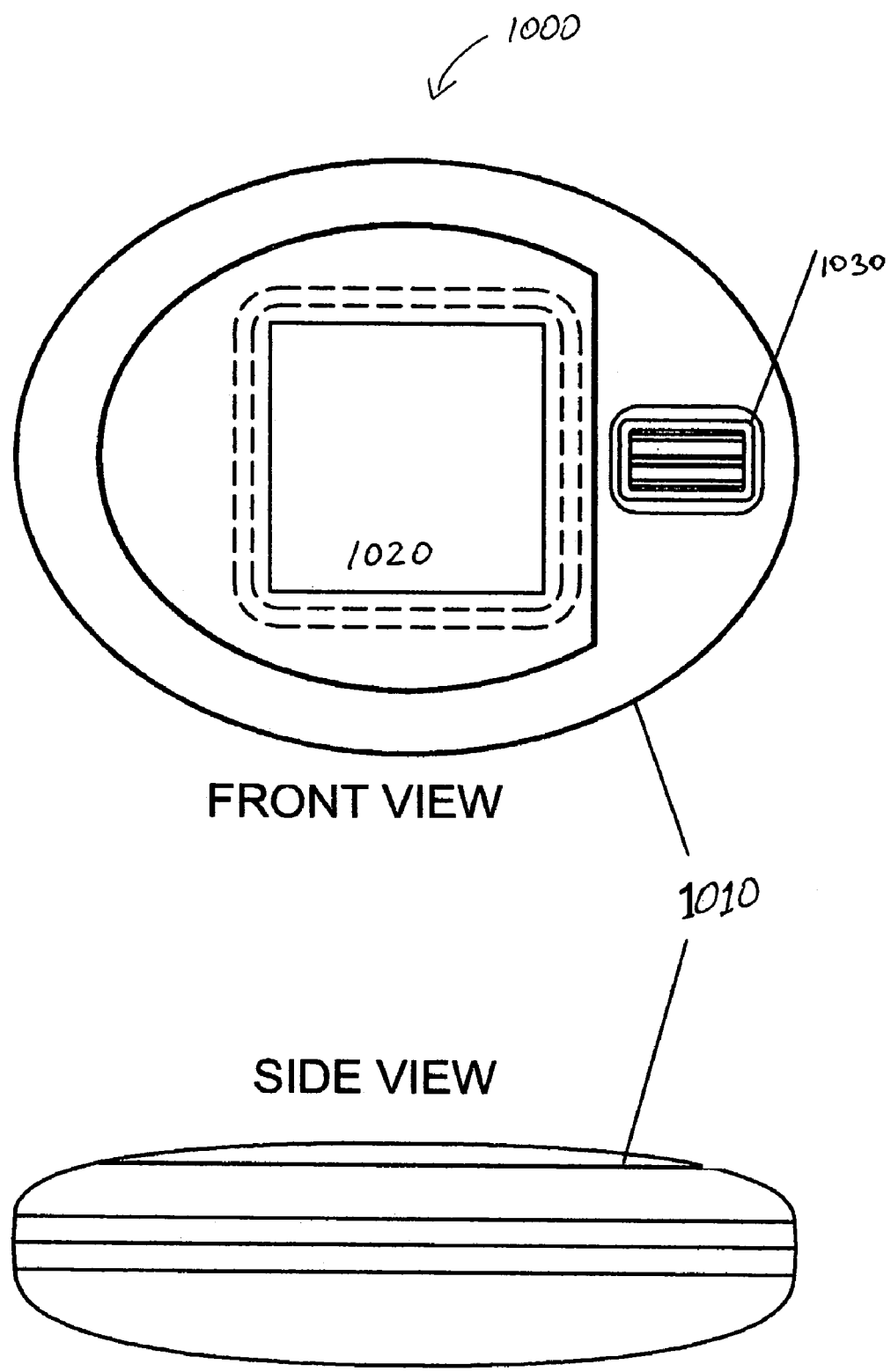
FIG. 10 shows top, side, and bottom views of another embodiment of a remote controller in accordance with the present invention.

FIG. 10 shows a top (front) view and a side view of another embodiment of a remote controller 1000 in accordance with the present invention. In this embodiment, the remote control 1000 includes an outer shell 1010 with a dot matrix LCD screen 1020, and a scroll wheel 1030, both disposed on the top surface of the outer shell 1010. As in the embodiment of FIG. 9, the scroll wheel 1030 includes a push-to-activate internal switch. Furthermore, remote controller 1000 is usable by either right- or left-handed users without a display inversion.

Figure 11:
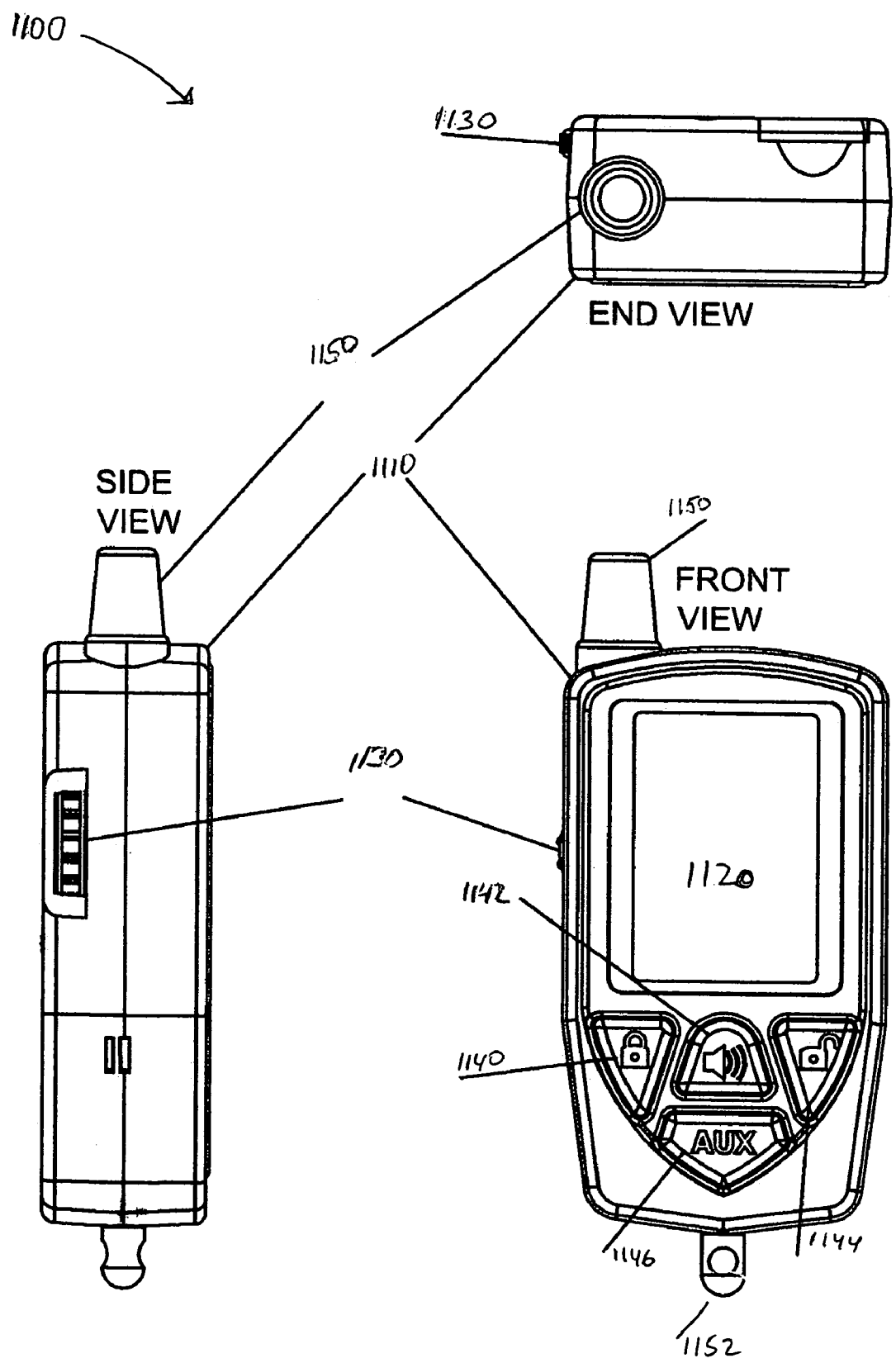
FIG. 11 shows front, left side, and top end views of a third embodiment of a remote controller in accordance with the present invention.

FIG. 11 shows three external views of a hand-held remote controller 1100 in accordance with the present invention: a front view, left side view, and top end view. The remote control 1100 is housed in an outer shell 1110, with a display 1120, and control press-to-activate keys 1140, 1142, 1144, and 1146 disposed on the front surface of the outer shell 1110. A user-operable scroll wheel with internal push-to-activate switch 1130 is mounted on the side of the remote control 1100; it is used for scrolling through the menu lists and selecting menu items. The display 1120 can be a dot matrix and/or a fixed text/icon LCD screen.

In this embodiment, the control key 1140 is a lock and/or arm switch. Depressing the key 1140 sends a locking command to the controlled system, in the case of a remote control keyless entry system; where the controlled system is a remotely controlled security system, depressing the key 1140 sends a locking and arming command. Depressing the key 1144 sends an unlocking command or an unlocking/disarming command to the controlled system. The key 1142 is a panic switch. Depressing it sends a command that initiates the panic mode of the security system. Typically, a security system activates a sounding device—a siren, horn—in the panic mode to draw attention of bystanders to the vehicle where the remotely controlled security system is installed. Auxiliary channel key 1146 is used to activate the primary auxiliary output, which can be connected to the vehicle's starting system or a trunk release. Typically, panic switch 1142 and trunk release/remote start switch 1146 would require an extended depression to activate the required command of the controlled system.

As illustrated in FIG. 11, the keys 1140, 1142, 1144, and 1146 are labeled in accordance with the functions assigned to these keys. Of course, other functions can be assigned to these keys, and other labels can be appropriate with different key assignments. The keys can also be labeled generically, for example, with letters A, B, C, and D.

Key assignments need not be permanent. In some embodiments, the installer or the user of the remote controller 1100 can determine the key assignments, for example, through a menu navigable by turning and depressing the scroll wheel 1130. The information for configuring the keys 1140–46, and other information used to configure the remote controller 1100, can also be uploaded to the remote control 1100 from another device, such as a personal computer or a personal digital assistant (PDA). In one illustrative embodiment, the key 1142 turns on and off back lighting of the display 1120 when it is depressed momentarily. If it is depressed for some predetermined longer time period, the key 1142 turns power on and off. The keys 1140 and 1144 can be assigned "scroll down" and "scroll up" menu functions, and the key 1146 can be used to select menu items. Thus, the keys can be used to navigate through the menus of the remote control 1100, instead of or in addition to the use of the scroll wheel 1130 for this purpose.

Numeral 1150 designates an antenna of the remote controller 1100. In this embodiment, the antenna is a helical/helix-type antenna. Numeral 1152 designates a key ring holder.

Figure 12:
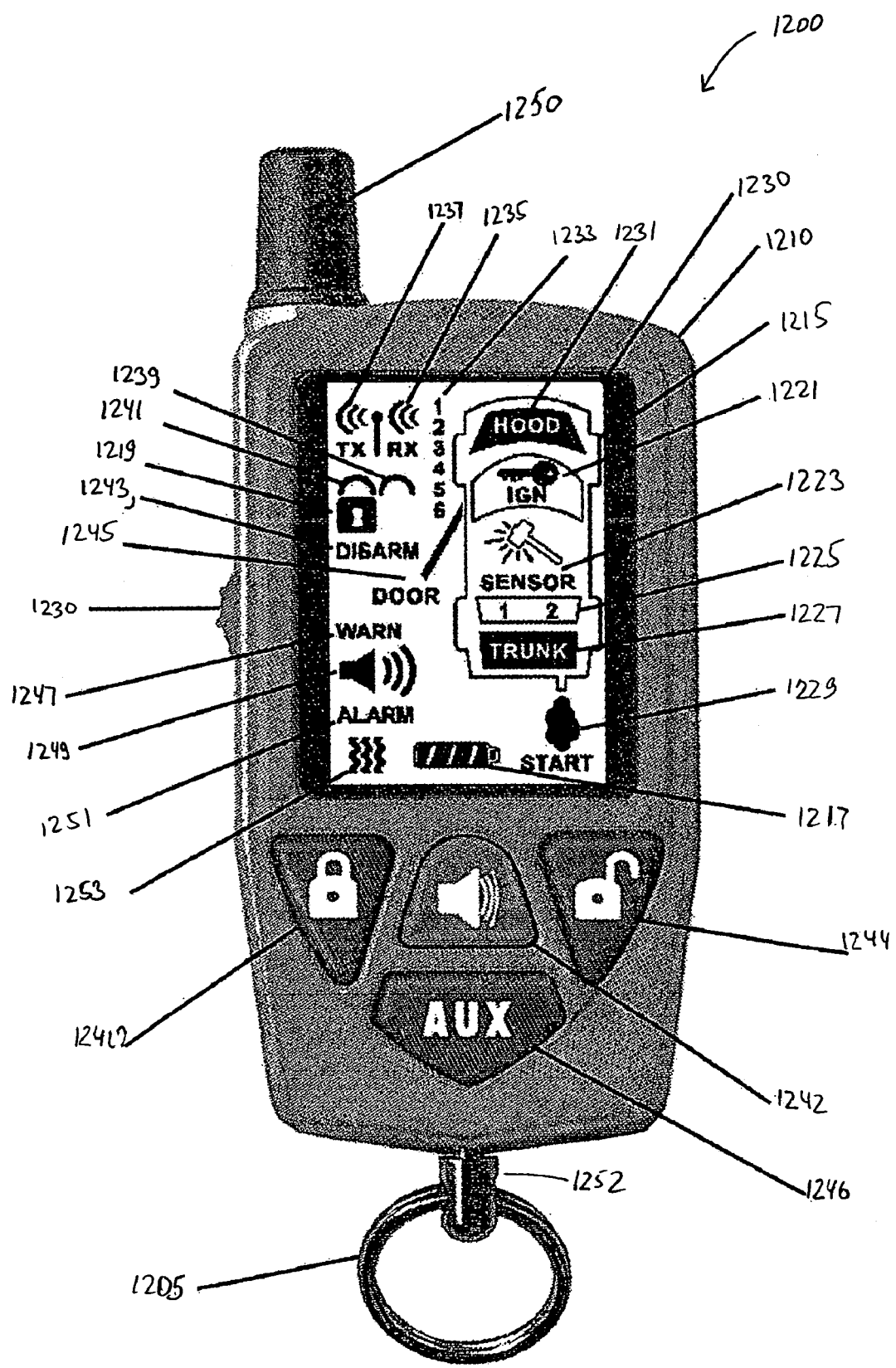
FIG. 12 shows a front view of a remote control transceiver of an automotive security system, in accordance with the present invention.

FIG. 12 shows a front view of a remote control transceiver 1200 of an automotive security system, in accordance with the present invention. In addition to the features of the remote control 1100 shown in FIG. 11, FIG. 12 also shows a key ring 1205 in the key ring holder 1252, and various icons displayed on a display screen 1230. The display 1230 is shown with fixed icons, but similar appearance can be obtained with a dot matrix display. In the illustrated embodiment, some of the icons are turned off until they are activated; but icons 1215 (vehicle outline), body portion of lock icon 1219, and battery reserve indicator 1217 remain on. An icon-by-icon description of the display 1230 of the illustrated embodiment follows.

1. Icons 1235 and 1237 flash to indicate to the user that the transceiver 1200 is in the process of receiving or transmitting data, respectively.

2. Ignition icon 1221 flashes when the vehicle's ignition is turned on while the remote control security system is armed; note that the alarm indicator icons 1249 (alarm sounding device), 1251 (alarm text icon), and 1253 (alarm vibration icon) also flash when an alarm occurs and the respective alarm indicators activate.

3. Sensor icons 1223 and 1225, and warning icon 1247 or alarm icon 1251 flash when sensor 1 or sensor 2 triggers the security system (along with icons 1249, 1251, and 1253, as described in the previous paragraph).

4. Trunk icon 1227 flashes if trunk opening triggers the security system (with icons 1249, 1251, and 1253).

5. Engine and start icon 1229 flashes if a remote engine start command is sent and the vehicle starts.

6. Hood icon 1231 flashes if hood opening triggers the security system (other alarm icons flash as well).

7. Locked loop icon 1241 and the "arm" portion of disarm icon 1243 are turned on after the remote control transceiver 1200 arms the security system and receives an acknowledgement of arming.

8. Unlocked loop icon 1239 and the complete disarm icon 1243 turn on after the remote control transceiver 1200 disarms the security system and receives an acknowledgement of disarming.

9. Door icon 1245 flashes when a door triggers the security system (other alarm icons also flash).

10. One of the channel indicators 1233 flashes to indicate a particular channel output.

Many of the icons can also be used for selecting remote commands to the security system and local commands to the remote control itself. In the embodiment of FIG. 12, the icons available for initiating an output command turn on when the user-operable scroll wheel 1230 is rotated. An icon can then be selected to initiate a transmission to the controlled system (i.e., the security system), or to send a local command. For example, the sensor icons 1223 and 1225, the warning icon 1247, and the alarm text icon 1251 are selected to turn on or off sensor 1 or 2 warnings or other alarm inputs to the controller of the security system; the trunk icon 1227 is used to initiate a trunk release command or turn off the trunk input; the engine and start icon 1229, is used to start the engine remotely; the hood icon 1231 is used to send a hood release command; the auxiliary channel number icons 1233 can be used to select an auxiliary channel output or to select a different vehicle; the disarm text icon 1243 along with lock and unlock loop icons 1241 and 1239 are used to send arm/lock and disarm/unlock commands to the security system; and the vibration icon 1253 is used to turn on and off the vibration signaling capability of the remote control 1200. The battery level is indicated on icon 1217 by the number of elements that are on all the time. This list is of course not exclusive.

Figure 13:
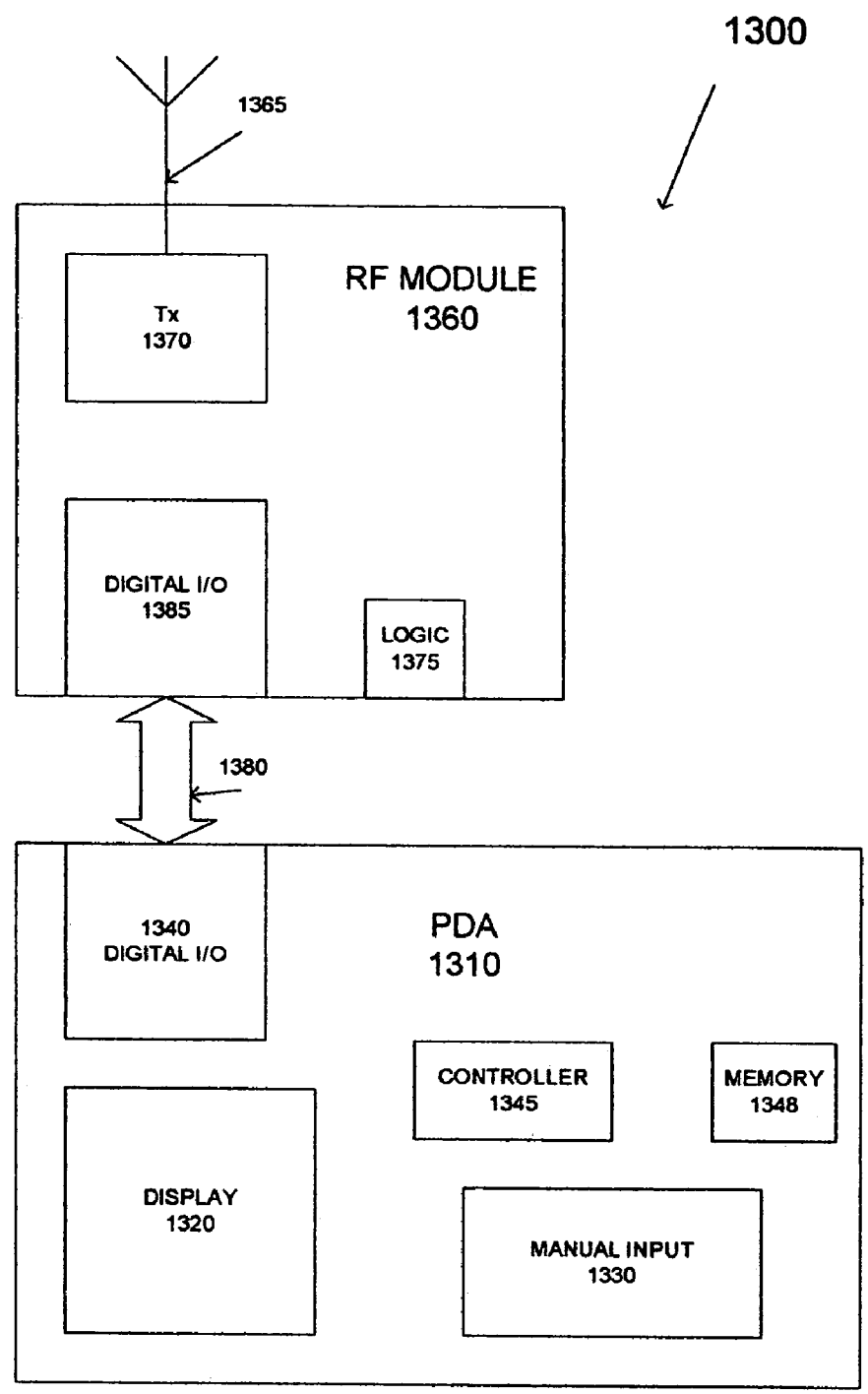
FIG. 13 is a simplified block diagram of an embodiment of a remote controller based on a hand-held general-purpose computing device.

FIG. 13 is a simplified block diagram of an embodiment of a remote controller 1300 based on a PDA or another general-purpose processing and interface device, and on an RF module 1360. The remote controller 1300 includes a PDA 1310 with its built-in manual input portion 1330, a display 1320, a digital I/O section 1340, a controller 1345, and a memory 1348. The manual input portion can be, for example, a keyboard or a stylus in combination with a touch-sensitive display 1320 and processing routines for recognizing writing made with the stylus. The controller 1345 in this embodiment is a microprocessor that controls the digital I/O section 1340 in addition to performing other functions. The controller 1345 and other logic of the PDA store data in the memory 1348.

The RF module 1360 is a specialized module that includes an RF transmitter or transceiver 1370 for sending commands to a controlled system, such as an automotive security system, through an antenna 1365. Digital I/O section 1385 of the RF module 1360 is designed to communicate with the digital I/O section 1340 of the PDA 1310 over a digital bus 1380. Clearly, a multitude of buses or serial interfaces and mechanical connections are available for use in this application. Logic section 1375, which can be part of the digital I/O section 1385, coordinates the communications between the digital, I/O section 1385 and the transceiver 1370. Some systems can be programmed to eliminate the digital I/O's 1340 and 1385, and logic circuit 1375 by sending/receiving serial data directly to/from the wireless transmitter/transceiver circuit 1370. This greatly reduces the cost of the added module to the PDA to allow its use as a remote controller.

The operations of the RF module 1360 are controlled by the PDA 1310 through the bus 1380. In essence, the RF module 1360 is a modem that allows communications between the remote control 1300 and its controlled system over a wireless channel. In one embodiment, the RF module 1360 is a card that plugs into an interface slot on the body of the PDA 1310, and draws power for its operation from the PDA 1310.

The controller 1345 operates under control of a program, stored or embodied in the memory 1348 or on a storage device, such as a magnetic disk/card, a solid state memory card (Flash, memory stick), an optical disk, or any other machine-readable storage medium. The program directs the controller to display menus of a remote control for a security system, such as the menus described above in connection with FIG. 12. The program also directs the PDA 1310 to cause the RF module 1360 to send commands to the controlled system (remote security system). The program further interprets and acts on the information received by the RF module from the security system.

Referring back to FIG. 3 for analogy, the RF module 1360 performs the functions of the transmitter or transceiver 311. The PDA 1310 performs the remaining functions of the remote control 290. Using this analogy, the role of the bus 1380 and of the digital I/O sections 1340 and 1345 is analogous to the connection between the controller 331 and the transmitter/transceiver 311 of FIG. 3 (a serial interface).

This document describes the inventive remote controllers and some of their features in considerable detail for illustration purposes only. Neither the specific embodiments of the invention as a whole, nor those of its features limit the general principles underlying the invention. The invention is not limited to any particular wireless remote controller, but includes all wireless as well as wired devices. Similarly, the invention may provide for transmission of authentication or authorization codes, in addition to transmission of control data. The invention is also not limited to automotive security system uses, but extends to all applications, including those involving home and other non-automotive security systems. And it should be noted that the particular displays and input devices used in the described embodiments need not constrain the general principles of the invention, because other displays (e.g., LED, plasma, text, graphical) and other input devices (e.g., eraser head, roller ball) can be successfully implemented in embodiments of the invention. The type of audible signals sent out by the remote controllers is not limited to simple sounds, such as beeps and chirps, but can include synthesized voice. The specific features described herein may be used in some embodiments, but not in others, without departure from the spirit and scope of the invention as set forth. Various physical arrangements of components and various links connecting remote controllers to their controlled systems also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

We claim:

1. A remote control transmitter for enabling a user to control remotely a security system, the security system having a base unit with a communication module, the remote control transmitter comprising:
   a processor;
   a display coupled to the processor to display information to the user under control of the processor;
   a first input device coupled to the processor to allow the processor to read state of the first input device, the state of the first input device being selected by the user;
   a second input device coupled to the processor to allow the processor to read state of the second input device, the state of the second input device being selected by the user;
   a transmitter coupled to the processor, the transmitter being capable of sending remote commands to the communication module of the base unit under control of the processor; and
   a memory module coupled to the processor, the memory module storing code executed by the processor;
   wherein:
      the processor under control of the code displays to the user various menu items on the display, enables the user to scroll among the menu items to point to one of the menu items using the first input device, and enables the user to select the menu item that is pointed to by using the second input device;
      the transmitter sends commands to the communication module of the base unit over a wireless link;
      the first input device comprises a scroll wheel with an internal push-to-activate switch operable by depressing the scroll wheel in a radial direction of the scroll wheel toward center of the scroll wheel and releasing the scroll wheel;
      the user selects the state of the first input device by rotating the scroll wheel;
      the second input device comprises the internal push-to-activate switch of the scroll wheel;
      the user selects the state of the second user device by depressing and releasing the scroll wheel;
      each of the menu items corresponds to at least one task of a plurality of tasks, the tasks of the plurality of tasks to be performed by the base unit and the remote control transmitter;
      each task to be performed by the base unit corresponds to at least one of the remote commands;
      the menu items comprise a screen inversion menu item, the plurality of tasks comprises a screen inversion task, the screen inversion menu item corresponds to the screen inversion task; and
      the code executed by the processor causes the processor to perform the screen inversion task and invert the display when the screen inversion menu item is selected.

2. A remote control transmitter in accordance with claim 1, wherein the security system is a security system installed in a vehicle.

3. A remote control transmitter in accordance with claim 2, further comprising:
   an outer housing for containing the processor, the display, the first and second input devices, the transmitter, and the memory module, the outer housing comprising a top surface, a bottom surface, and sidewalls;
   wherein:
   the display is disposed on the top surface of the outer housing; and
   the scroll wheel is disposed on one of the sidewalls of the outer housing and protrudes from said one of the sidewalls.

4. A remote control transmitter in accordance with claim 3, wherein the top surface of the outer housing has a longer dimension and a shorter dimension substantially perpendicular to each other, the loaner dimension being less than about 6 inches, the shorter dimension being less than about 4 inches.

5. A remote control transmitter in accordance with claim 3, wherein the longest dimension of the top surface of the outer housing is less than about 1.5 inches.

6. A remote control transmitter in accordance with claim 5, wherein the pressure needed to activate the internal switch is between about 0.15 and 0.75 ounces.

7. A remote control transmitter in accordance with claim 2, further comprising:
   an outer housing for housing the processor, the display, the first and second input devices, the transmitter, and the memory module, the outer housing comprising a top surface, a bottom surface, and sidewalls;
   wherein:
   the display is disposed on the top surface of the outer housing; and
   the scroll wheel is disposed on the top surface of the outer housing and protrudes from the top surface of the outer housing.

8. A remote control transmitter in accordance with claim 7, wherein the longest dimension of the top surface of the outer housing is less than about 1.5 inches.

9. A remote control transmitter in accordance with claim 8, wherein the pressure needed to activate the internal switch is between about 0.15 and 0.75 ounces.

10. A remote control transmitter for enabling a user to control remotely a security system, the security system having a base unit with a communication module, the remote control transmitter comprising:
    a processor;
    a display coupled to the processor to display information to the user under control of the processor;
    a first input device coupled to the processor to allow the processor to read state of the first input device, the state of the first input device being selected by the user;
    a second input device coupled to the processor to allow the processor to read state of the second input device, the state of the second input device being selected by the user;
    a transmitter coupled to the processor, the transmitter being capable of sending remote commands to the communication module of the base unit under control of the processor;
    a memory module coupled to the processor, the memory module storing code executed by the processor; and
    an input data port capable of receiving the code executed by the processor;
    wherein the processor under control of the code displays to the user various menu items on the display, enables the user to scroll among the menu items to point to one of the menu items using the first input device, enables the user to select the menu item that is pointed to by using the second input device, reads the code from the input data port, and stores the code in the memory module.

11. A remote control transmitter in accordance with claim 10, wherein the information on the display comprises at least one icon determined by the code read by the processor from the input data port.

12. A remote control security system installed in a vehicle, the security system comprising:
- a base unit comprising a base controller, security sensors coupled to the base controller, and a communication module; and
- a remote control transmitter enabling a user to operate the base unit, the remote control transmitter comprising:
  - a processor;
  - a display coupled to the processor to display information to the user under control of the processor;
  - a first input device coupled to the processor to allow the processor to read state of the first input device, the state of the first input device being selected by the user;
  - a second input device coupled to the processor to allow the processor to read state of the second input device, the state of the second input device being selected by the user;
  - a transmitter coupled to the processor, the transmitter being capable of sending remote commands to the communication module of the base unit under control of the processor; and
  - a memory module coupled to the processor, the memory module storing code executed by the processor;
  - wherein:
    - the processor under control of the code displays to the user various menu items on the display, enables the user to scroll among the menu items to point to one of the menu items using the first input device, and enables the user to select the menu item that is pointed to by using the second input device;
    - the communication module and the transmitter communicate over a wireless link;
    - the first input device comprises a scroll wheel with an internal push-to-activate switch operable by depressing the scroll wheel in a radial direction of the scroll wheel toward center of the scroll wheel and releasing the scroll wheel, for enabling the user to select the state of the first input device by rotating the scroll wheel;
    - the second input device comprises the internal push-to-activate switch of the scroll wheel for enabling the user to select the state of the second user device by depressing the scroll wheel;
    - each of the menu items corresponds to at least one task of a plurality of tasks, the tasks of the plurality of tasks to be performed by the base unit and the remote control transmitter;
    - the menu items comprise a screen inversion menu item, the plurality of tasks comprises a screen inversion task, the screen inversion menu item corresponds to the screen inversion task; and
    - the code executed by the processor causes the processor to perform the screen in version task and invert the display when the screen inversion menu item is selected.

13. A remote controller for enabling a user to control a security system installed in a vehicle, the security system comprising a base unit with a communication module, the remote controller comprising:
- means for processing data;
- means for displaying information to the user under control of the means for processing;
- first input means for assuming at least two states under control of the user, the first input means being coupled to the processing means to allow the processing means to read the states of the first input means;
- second input means for assuming at least two states under control of the user, the second input means being coupled to the processing means to allow the processing means to read the states of the second input means;
- a transmitter coupled to the processing means, the transmitter being capable of sending remote commands over an RF link to the communication module of the base unit under control of the processing means; and
- memory means coupled to the processing means, the memory means storing code executed by the processing means;
- wherein:
  - the processing means under control of the code displays to the user various menu items on the display means, allows the user to scroll among the menu items to point to one of the menu items using the first input means, and allows the user to select the menu item that is pointed to by using the second input means;
  - the first input means comprises a scroll wheel;
  - the user selects the state of the first input means by rotating the scroll wheel;
  - the second input means comprises an internal push-to-activate switch of the scroll wheel;
  - the user selects the state of the second input means by depressing the scroll wheel in a radial direction of the scroll wheel toward center of the scroll wheel and releasing the scroll wheel;
  - each of the menu items corresponds to at least one task of a plurality of tasks, the tasks of the plurality of tasks to be performed by the base unit and the remote controller;
  - the menu items comprise a screen inversion menu item, the plurality of tasks comprising a screen inversion task, the screen inversion menu item corresponding to the screen inversion task; and
  - the code executed by the processing means causes the processing means to perform the screen inversion task and invert the display means when the screen inversion menu item is selected.

14. A remote controller in accordance with claim 13, wherein at least one of the tasks performed by the base unit is a function-programming task for configuring the base unit.

15. A remote controller in accordance with claim 14, wherein the function-programming task is selected from the list consisting of passive arming, active arming, enabling confirming chirps for arm and disarm state changes, disabling confirming chirps for arm and disarm state changes, turning on ignition locking of doors, and turning off ignition locking of doors.

* * * * *